(12) United States Patent
Rinard et al.

(10) Patent No.: US 6,433,954 B1
(45) Date of Patent: Aug. 13, 2002

(54) TAPE CARTRIDGE HOLDER WITH MISINSERTION PREVENTION STRUCTURE

(75) Inventors: Eric A. Rinard, Boulder; Clark D. Brace, Westminster, both of CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

(21) Appl. No.: 09/124,579

(22) Filed: Jul. 29, 1998

Related U.S. Application Data

(63) Continuation of application No. PCT/US98/08697, filed on Apr. 30, 1998.
(60) Provisional application No. 60/045,127, filed on Apr. 30, 1997.

(51) Int. Cl.$^7$ .................... G11B 15/68; B65D 85/672
(52) U.S. Cl. ..................... 360/92; 206/387.15
(58) Field of Search ................... 312/9.48, 9.55, 312/9.9, 9.32; 360/92; 369/36; 414/277–281; 206/307.1, 387.1, 387.15

(56) References Cited

U.S. PATENT DOCUMENTS

| | | | |
|---|---|---|---|
| 4,293,075 A | * 10/1981 | Veralrud | 211/40 |
| 4,678,245 A | * 7/1987 | Fouassier | 312/9.22 |
| 4,730,735 A | * 3/1988 | Lechner | 206/387.15 |
| 4,772,077 A | * 9/1988 | Beam et al. | 206/387.15 |
| 4,802,035 A | 1/1989 | Ohtsuka | 360/92 |
| 4,844,564 A | * 7/1989 | Price, Sr. et al. | 312/9.46 |
| 4,846,355 A | * 7/1989 | Price, Sr. et al. | 211/41.12 |
| 5,021,902 A | * 6/1991 | Ishikawa et al. | 360/92 |
| 5,036,503 A | 7/1991 | Tomita | 369/36 |
| 5,103,986 A | 4/1992 | Marlowe | 211/41 |
| 5,139,320 A | * 8/1992 | Banker | 312/9.53 |
| 5,182,686 A | 1/1993 | Lindenmeyer | 360/92 |
| 5,193,891 A | * 3/1993 | Headley | 312/348.3 |
| 5,235,474 A | 8/1993 | Searle | 360/71 |
| 5,297,675 A | 3/1994 | Martucci | 206/309 |
| 5,345,350 A | 9/1994 | Ellis et al. | 360/92 |
| 5,359,476 A | 10/1994 | Dalziel | 360/92 |
| 5,449,091 A | 9/1995 | Dalziel | 221/81 |
| 5,450,391 A | 9/1995 | Pollard | 369/191 |
| 5,515,356 A | 5/1996 | Lee | 369/178 |
| 5,768,047 A | * 6/1998 | Ulrich et al. | 360/92 |
| 5,867,458 A | * 2/1999 | Barkley et al. | 206/387.15 |
| 5,926,351 A | * 7/1999 | Abe | 360/132 |

FOREIGN PATENT DOCUMENTS

WO    WO 98/49682    11/1998

\* cited by examiner

*Primary Examiner*—Brian E. Miller
(74) *Attorney, Agent, or Firm*—Holme Roberts & Owen LLP; Christopher J. Kulish, Esq.

(57) ABSTRACT

The present invention provides a data cartridge holder that is capable of accommodating a plurality of 8 mm tape cartridge. The holder includes retaining structure for engaging a discontinuity located between the door and the side of an 8 mm cartridge to retain the cartridge in the holder. Also included in the holder are orientation structure that inhibit the insertion of an incorrectly oriented 8 mm cartridge into the holder. The cartridge holder further includes a mounting structure that permits the holder to be removably mounted in a tape library. A dust cover is also provided that can be attached to the holder when, for example, the holder is mounted in a tape library and thereby prevent the dust cover from being lost or misplaced.

28 Claims, 22 Drawing Sheets

TAPE CARTRIDGE HOLDER WITH MISINSERTION PREVENTION STRUCTURE

This application is a continuation of PCT/US98/08697 filed Apr. 30, 1998, which claims the benefit of provisional application No. 60/045,127 filed Apr. 30, 1997.

FIELD OF THE INVENTION

The present invention relates to a data cartridge holder that is capable of accommodating a plurality of data cartridges.

BACKGROUND OF THE INVENTION

Data cartridge holders are box-like structures that are used to retain one or more data cartridges in a preferred orientation. For example, data cartridge holders are integral parts of tape libraries that store a plurality of tape cartridges. To elaborate, the typical tape library includes one or more tape cartridge holders for accommodating a plurality of tape cartridges, a player/recorder for reading/writing data from/on a recording tape located within a tape cartridge, and a picker assembly for moving tape cartridges between the tape cartridge holders and the player/recorder. In tape libraries, the typical tape cartridge holder is used to place the tape cartridges in preferred orientation that facilitates the operation of the picker assembly. For example, one or more tape cartridge holders can be used to position tape cartridges in a one-dimensional vertical array, a two-dimensional x-y array or a curved array.

Data cartridge holders that are capable of accommodating a plurality of data cartridges typically include an open-sided box-like structure with partitioning elements that divide the interior space of the box-like structure up into a plurality of slots that are each capable of accommodating a data cartridge. In many cases, it is also desirable to prevent the accidental or unintentional dislodgement of a data cartridge that is being stored in such a holder. For example, if a tape cartridge were to fall out of a slot in a tape cartridge holder in a tape library, the dislodged tape could disrupt the operation of the picker assembly. Consequently, many data cartridge holders employ a retaining structure that prevents an unintentional dislodgement of a data cartridge but permits a desired extraction of the data cartridge from the holder.

Also part of many data cartridge holders are orientation structures that inhibit the insertion of a data cartridge into the holder if the cartridge is incorrectly oriented. The orientation of a data cartridge is important in many situations. For example, in tape libraries, the tape cartridges must be properly oriented in the tape cartridge holders so that when the picker assembly is moving a tape cartridge from the holder to the player/recorder, the picker does not have to re-orient the tape cartridge for insertion into the player/recorder.

SUMMARY OF THE INVENTION

The present invention is directed to a data cartridge holder that is capable of accommodating a plurality of data cartridges and has a retaining structure that takes advantage of one or more features associated with the door of a cartridge. The 8 mm tape cartridge possesses several of the door related features that are utilized by the retaining structure of the present invention to retain a cartridge. To elaborate, an 8 mm tape cartridge has a housing that includes two lateral sides that are substantially parallel to one another, a front side and back side that are also substantially parallel to one another, and top and bottom sides that are substantially parallel to one another. A U-shaped door provides, when open, access to the tape media located within the housing and when closed, protects the tape from being damaged. The U-shaped door includes a pair of lateral sides that are pivotally connected to and form part of the lateral sides of the housing. A front face of the door connects the lateral sides of the door to one another and forms the front side of the housing. The lateral sides of the housing each include a gripper notch that is used by a picker assembly to insert/retract a data cartridge. Further, the lateral sides of the door each include a small hole, sometimes known as a light path window, that is used by a player/recorder to determine when the door is open and closed. Between one of the lateral sides of the door and the remainder of the housing is a discontinuity. Characteristic of this discontinuity is that the outer edge of the door forms part of the discontinuity and that the discontinuity changes in shape when the door is moved between the open and closed positions.

The retaining structure of the data cartridge holder makes use of the discontinuity associated with the door to prevent the accidental or unintentional removal of the cartridge from the holder. By using the discontinuity associated with the door rather than the gripper notches or light path windows to retain a data cartridge, a number of problems are avoided. For instance, a retaining structure that makes use of the gripper notches to retain a data cartridge in a holder can interfere with the operation of the picker mechanism during insertion/extraction operations. Similarly, a retaining structure that uses the light path windows can potentially damage the windows and thereby inhibit the function for which they were designed, i.e. for the detection of whether the door is open or closed.

One embodiment of the retaining structure of the data cartridge holder includes a cantilever member with a first end that is fixed to a wall of the cartridge holder a second end that engages the particular door feature that is being exploited to retain the data cartridge and is capable of flexing in response to, for example, the insertion/retraction of a data cartridge by the picker. In a particular embodiment that facilitates manufacture of the holder, the first or fixed end of the cantilever is located directly below the second or free end of the cantilever member. With this orientation, the fixed end of the cantilever member is located closer to the bottom wall of the holder and the free end of the cantilever member is located closer to the open side of the holder, i.e. the side through which the data cartridges and inserted and retracted.

Also provided by the present invention is a data cartridge holder with an orientation structure that is used to inhibit the complete insertion of an incorrectly oriented 8 mm tape cartridge into the holder. To elaborate, analysis of the 8 mm tape cartridge revealed a ramp that extends between the front and top faces of the cartridge, which is essentially one of the four longitudinal corners of the cartridge housing. None of the other longitudinal corners of the housing have such a ramp. Stated differently, the ramp is an asymmetry. The data cartridge holder exploits this asymmetry to prevent the complete insertion of an incorrectly oriented data cartridge into the holder. In one embodiment, a structure that is complementary to the shape of the ramp is established at each end of a slot. The structure operates to permit the complete insertion of a correctly oriented cartridge. However, the structure inhibits the complete insertion of an incorrectly oriented cartridge. Characteristic of an incorrectly oriented data cartridge is that one of the other longitudinal corners will come into contact with the orientation structure. Since none of these other longitudinal corners have a ramp that is complementary to the orientation structure, the structure will interfere or prevent the cartridge from being completely inserted into the holder.

In yet another embodiment, a data cartridge holder is provided that can be inserted into and removed from a tape library. The holder includes an open-side box-like structure for holding the cartridges, a dust cover and a coupling apparatus for attaching the dust cover to the holder when the holder is in use, i.e. mounted in a tape library such that cartridges can be inserted into and removed from the holder. When the holder is not in use, i.e. not operably positioned within a tape library, the dust cover can be placed over the opening of the box-like structure to protect any data cartridges housed within. In one embodiment, the dust cover has a U-shaped cross section and the coupling apparatus serves to connect the dust cover to the box-like structure such that the box-like structure is nested in side the U-shaped dust cover. A further embodiment of the holder includes a connector for use in attaching/detaching the holder from/to a library. Also part of such a connector is a reference device that is used to assure the proper orientation of the holder within a library.

DETAILED DESCRIPTION

Figure 1:
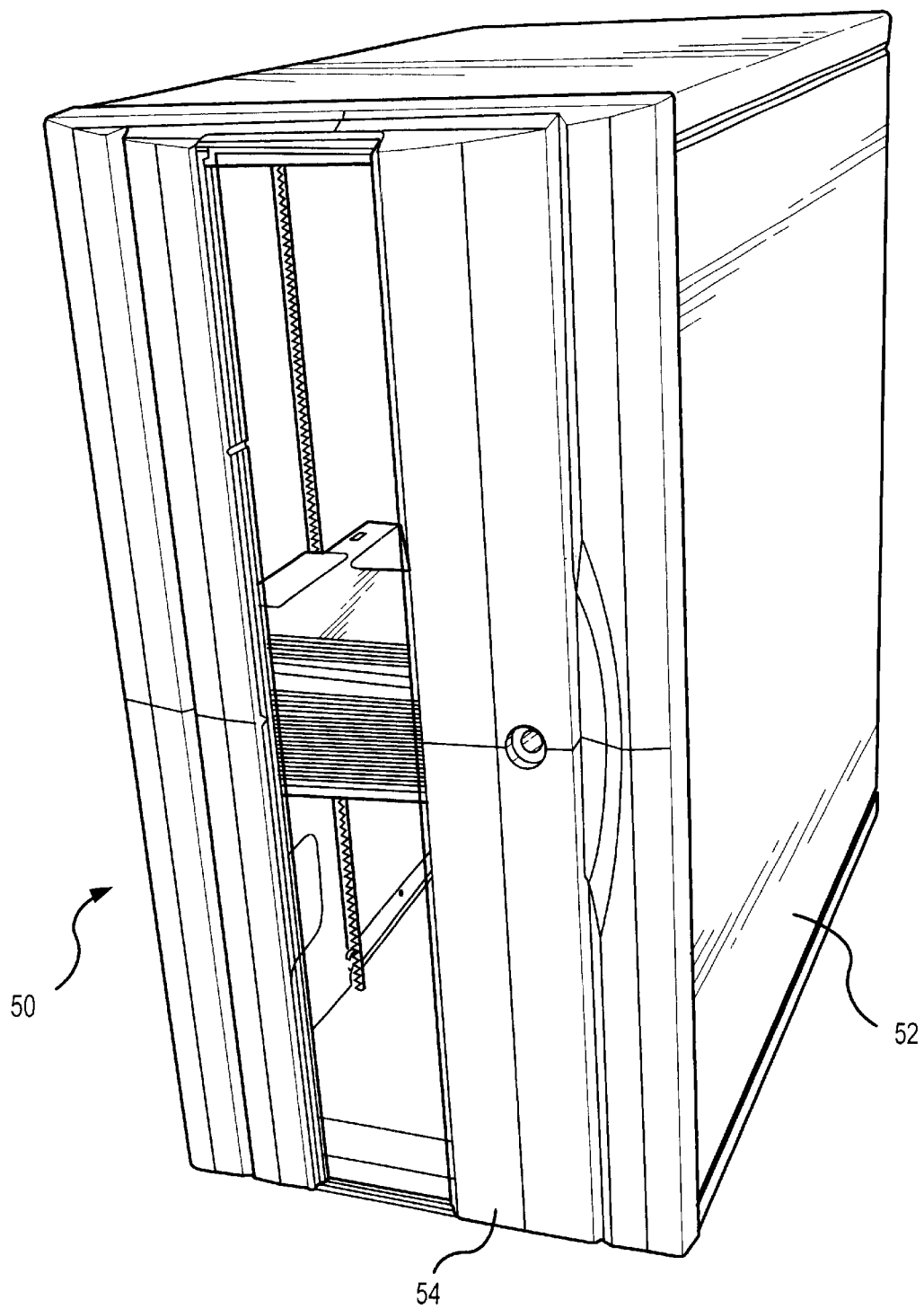
FIG. 1 is an exterior perspective view of a preferred embodiment of the tape library system.
Figure 2:
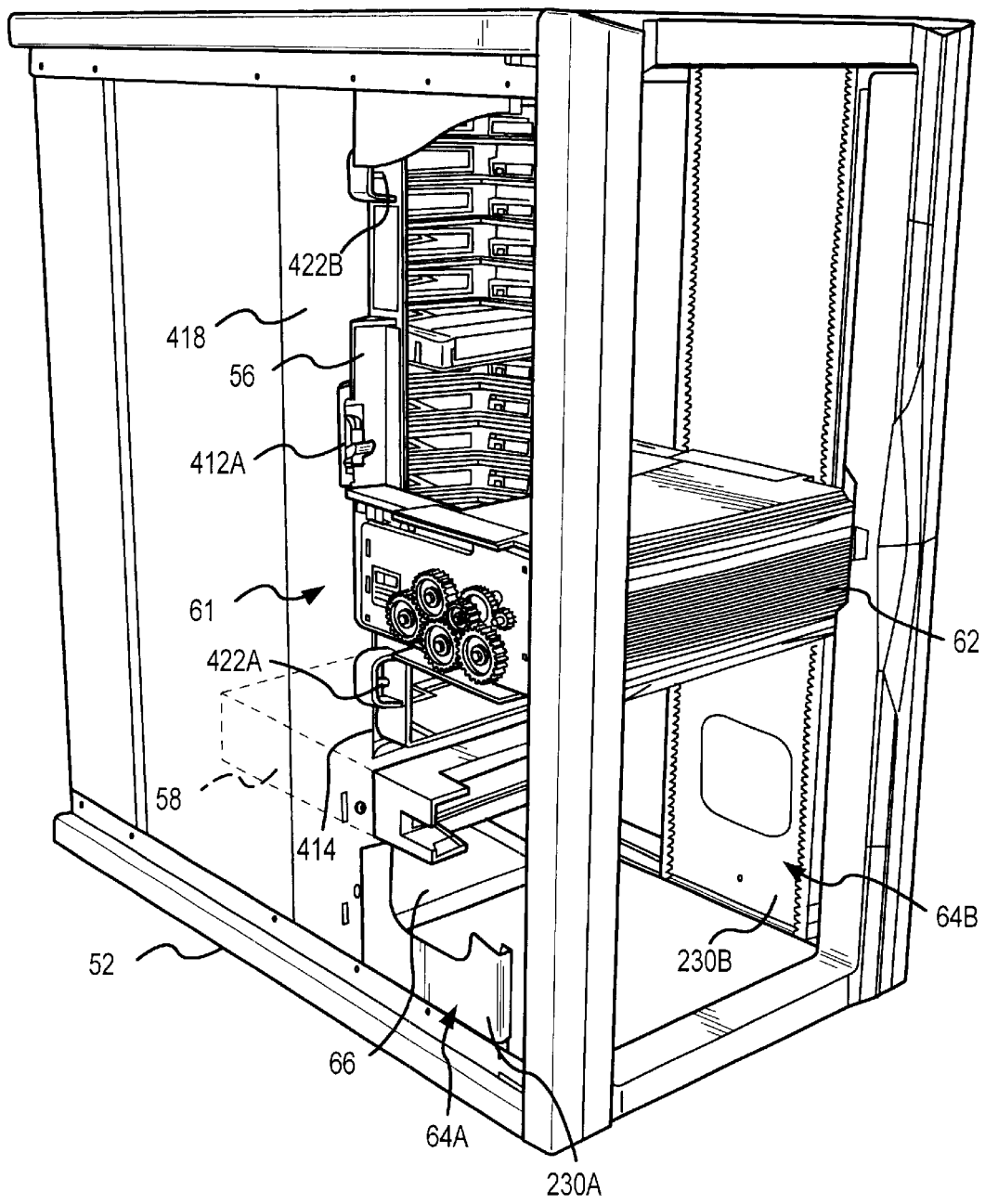
FIG. 2 is a cutaway, perspective view of the embodiment of the tape library system shown in FIG. 1.

With reference to FIGS. 1 and 2, the primary components associated with the preferred embodiment of the tape library system, hereinafter referred to as library 50, are described. The library 50 includes a cabinet 52 for housing components of the library and a door 54 that permits user access into the interior of the cabinet 52. Within the cabinet are located a removable, tape cartridge holder 56 for storing a plurality of 8 mm tape cartridges, an 8 mm tape drive 58, and a transport assembly for moving tape cartridges between the holder 56 and the tape drive 58. The transport assembly includes an elevator assembly 61 that employs a pair of rack gear pairs 64A, 64B to move tape cartridges that are held by a picker assembly 62 between the holder 56 and the tape drive 58. The tape drive 58 is capable of transmitting/receiving data to/from a host computer via a data communication interface (not shown) that is located on the back of the cabinet. While the library 50 is shown as only having one tape drive, it should be appreciated that a slot 66 is available for accommodating another tape drive. The library 50 can be positioned either vertically, as shown, or horizontally.

Figure 3A:
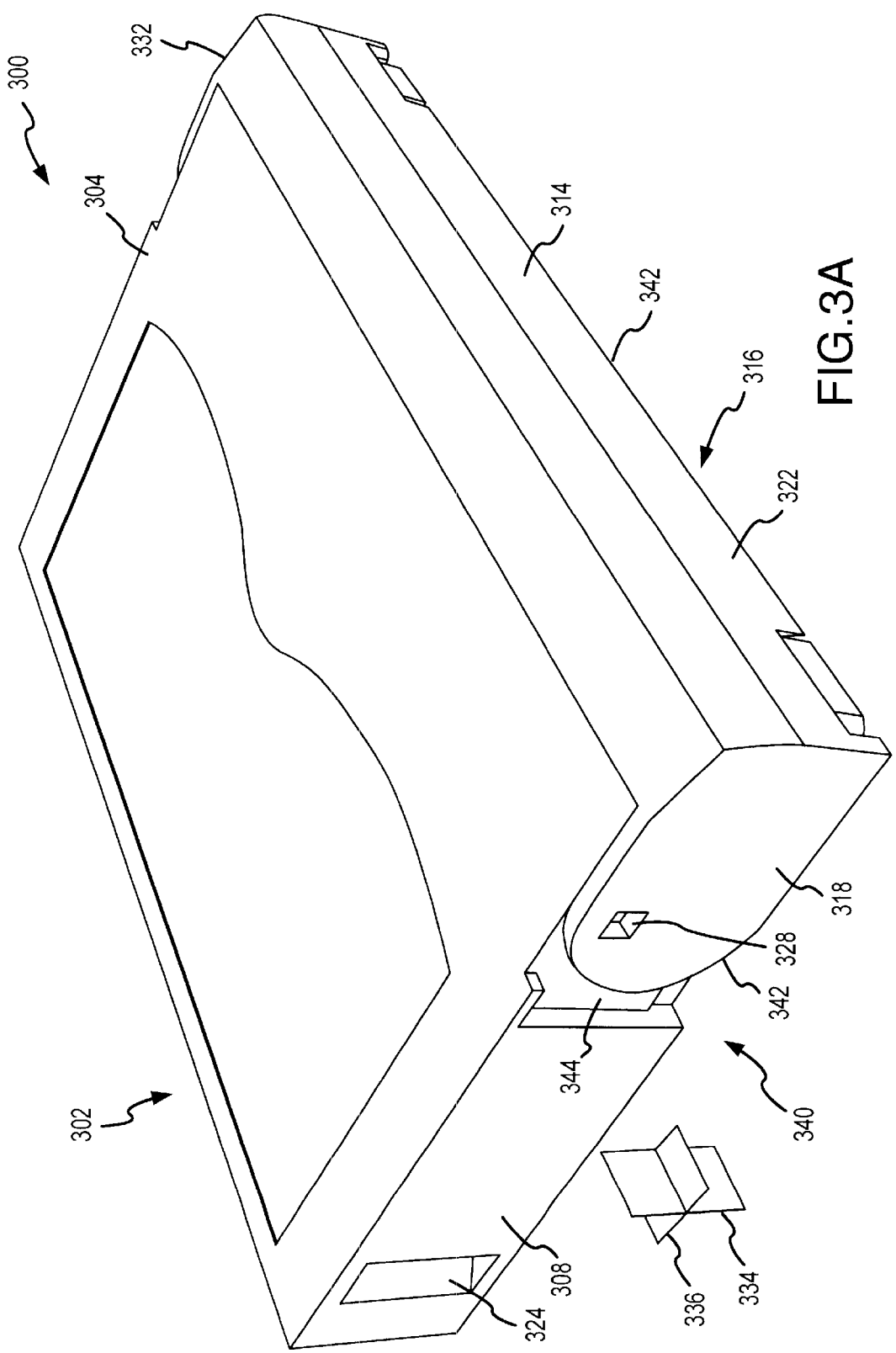
FIGS. 3A–3C are perspective views of an 8 mm tape cartridge that is employed in the tape library system shown in FIG. 1.
Figure 3B:
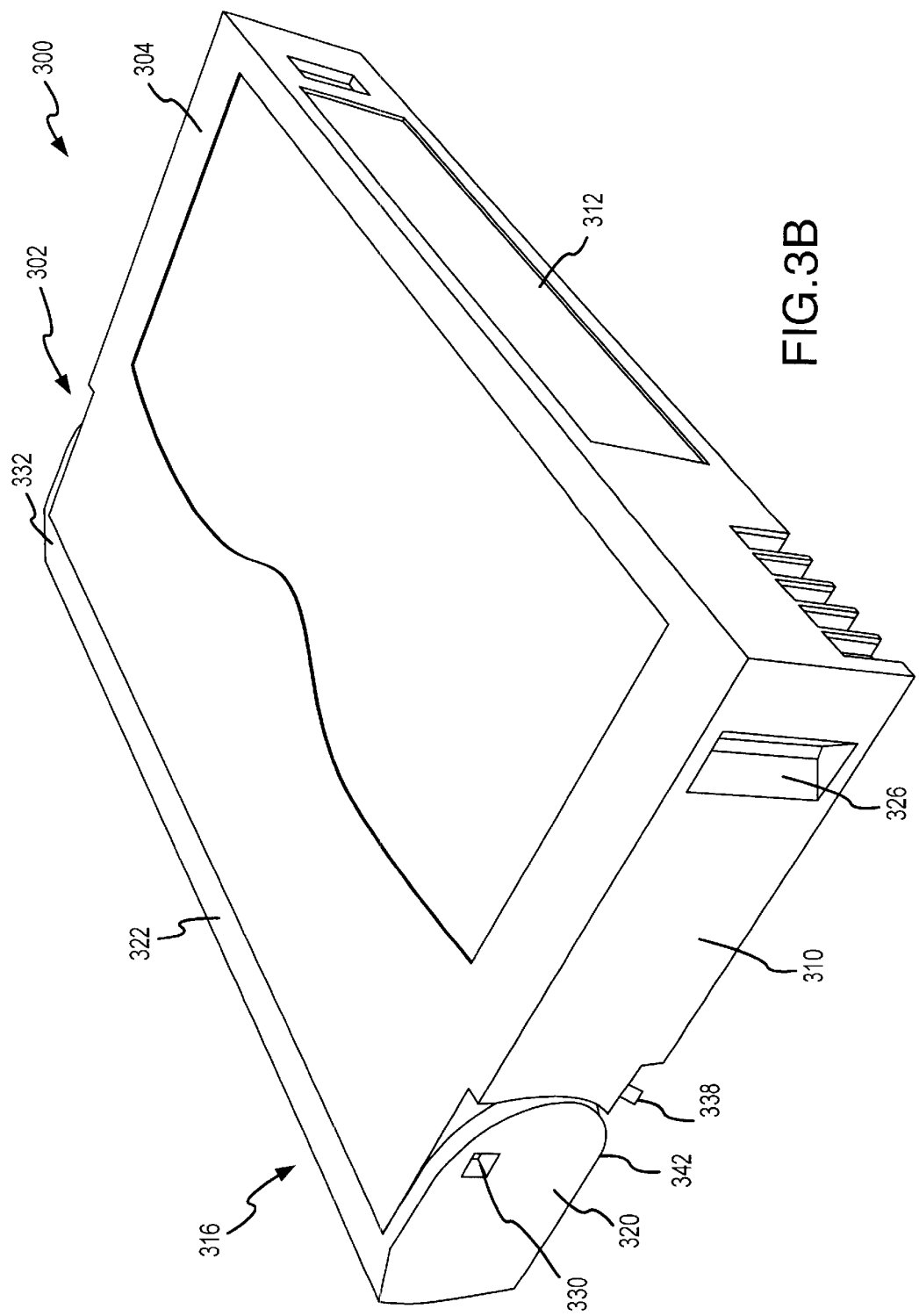
Figure 3C:
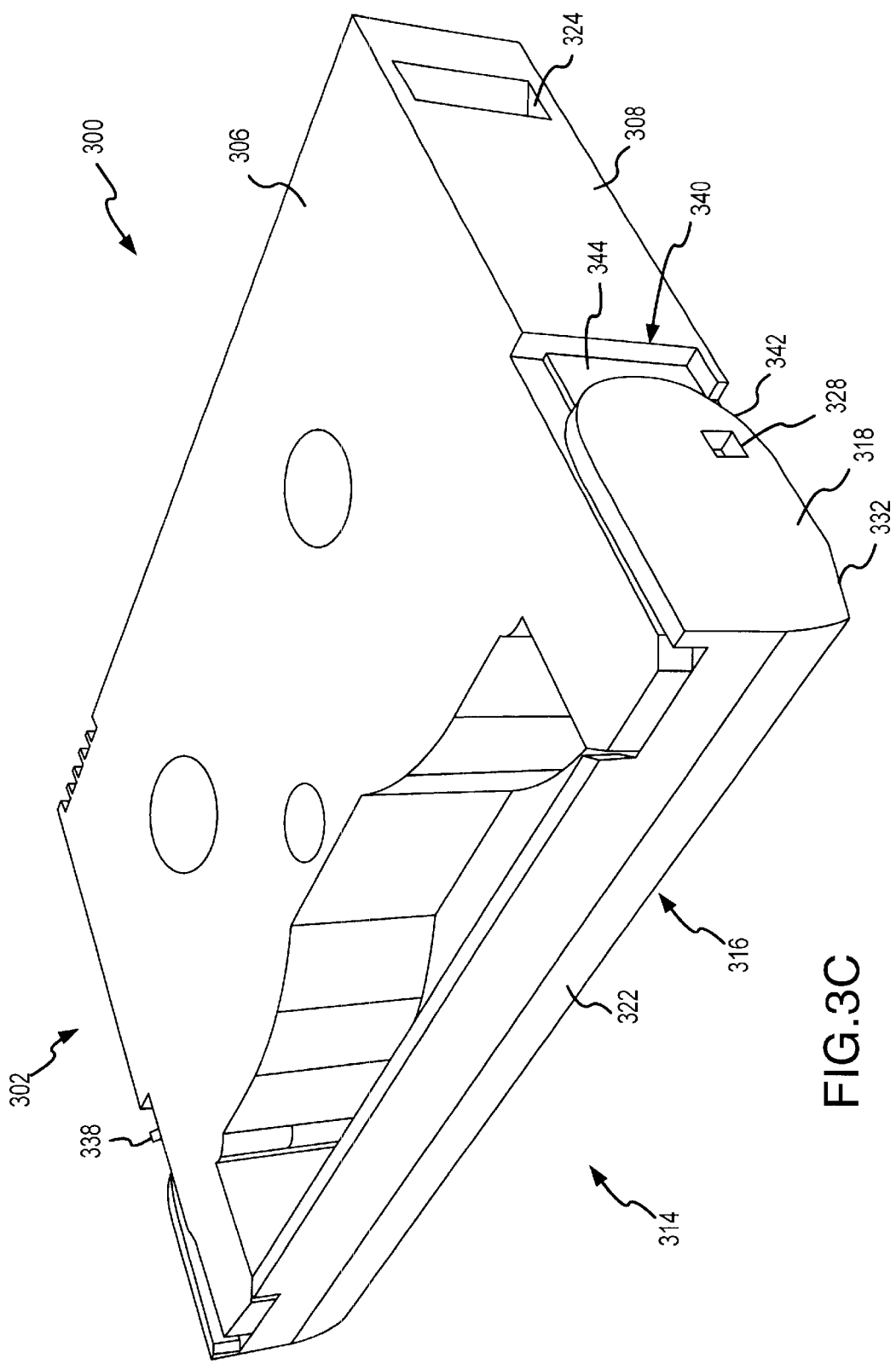

FIGS. 3A–3C illustrate an 8 mm tape cartridge 300 suitable for use with the 8 mm tape drive 58. The 8 mm tape cartridge 300 includes a housing 302 that is comprised of a top side 304, bottom side 306 that is substantially parallel to the top side 304, a first lateral side 308, a second lateral 310 that is substantially parallel to the first lateral side 308, a back side 312, and a front side 314 that is substantially parallel to the back side 312. Also part of the housing 302 is a U-shaped door 316 that when open, exposes the magnetic tape located within the cartridge, and when closed, protects the tape. The U-shaped door 316 has a first and second hinged sides 318, 320 that are pivotally and respectively connected to the housing. A cross-member 322 forms extends between and connects the first hinged side 318 and the second hinged side 320. The first and second hinged sides 318, 320 also respectively form portions of the first and second lateral sides 308, 310 of the housing 302. Similarly, the cross-member 322 forms substantially all of the front side 314 of the housing 302.

With continuing reference to FIGS. 3A–3C, respectively associated with the first and second lateral sides 308, 310 are first and second gripper notches 324, 326. The gripper notches 324, 326 are primarily used by the picker assembly 62 to hold on to a cartridge during transport of the cartridge between the holder 56 and the tape drive 58.

Also associated with the first and second lateral sides 308, 310 are first and second light windows 328, 330. The purpose of the first and second light windows 328, 330 is to facilitate a determination of whether the door 316 is open or closed. To elaborate, when the door 316 is completely open so that data can be written on or read from the tape, the first and second light path windows 328, 330 are each aligned with an interior window (not shown) that exposes a reflective portion of the tape. If the first and second light path windows 328, 330 are not aligned with their respective interior windows, the reflective portion of the tape is not completely exposed. The tape drive 58 uses the reflectivity to determine if the door 316 is open or closed. If the reflectivity is above a certain level, the door 316 is open and data transfer operations can commence. Conversely, if the reflectivity is below a certain level, the door 316 is not sufficiently open for data transfer operations to commence.

Further characteristic of the 8 mm tape cartridge 300 is a ramp 332 formed by a portion of the top side 304 and the front side 314 of the housing 302. Notably, the ramp 332 forms an asymmetry with respect to both a first transverse plane 334 and second transverse plane 336 of the cartridge 300, i.e. there is not a corresponding ramp structure between the bottom side 306 and the front side 314 or between the top side 304 and the back side 312. Moreover, there is not a similar ramp structure between the bottom side 306 and the back side 312. This asymmetry is utilized, as described hereinafter, to realize an orientation structure that prevents improperly oriented cartridges from being inserted into the holder 56.

Located adjacent to the second hinged side 320 of the U-shaped door 316 is a switch 338 that, when in a first position permits the door 316 to be opened. Typically, the tape drive 58 places the switch in the first position so that the door can be opened and data transfers with the tape can commence. The switch 338 when in a second position, latches the door 316 to prevent the tape from being accidentally exposed and the data contained thereon compromised.

A further characteristic of the 8 mm tape cartridge 300 is a discontinuity 340 that is located between the first hinged side 318 of the door 316 and the first gripper notch 324. The discontinuity is defined, in part, by the outer edge 342 of the door 316, i.e. the edge that defines the extent of the door, on the first hinged side 318. The discontinuity 340 is also defined by a floor 344. The outer edge 342 and the floor 344 combine to from a step-like discontinuity that is used, as described hereinafter, to retain a cartridge within the holder 56. It should also be appreciated that the shape of the discontinuity changes when the door 316 is moved between the closed and open states.

Figure 4:
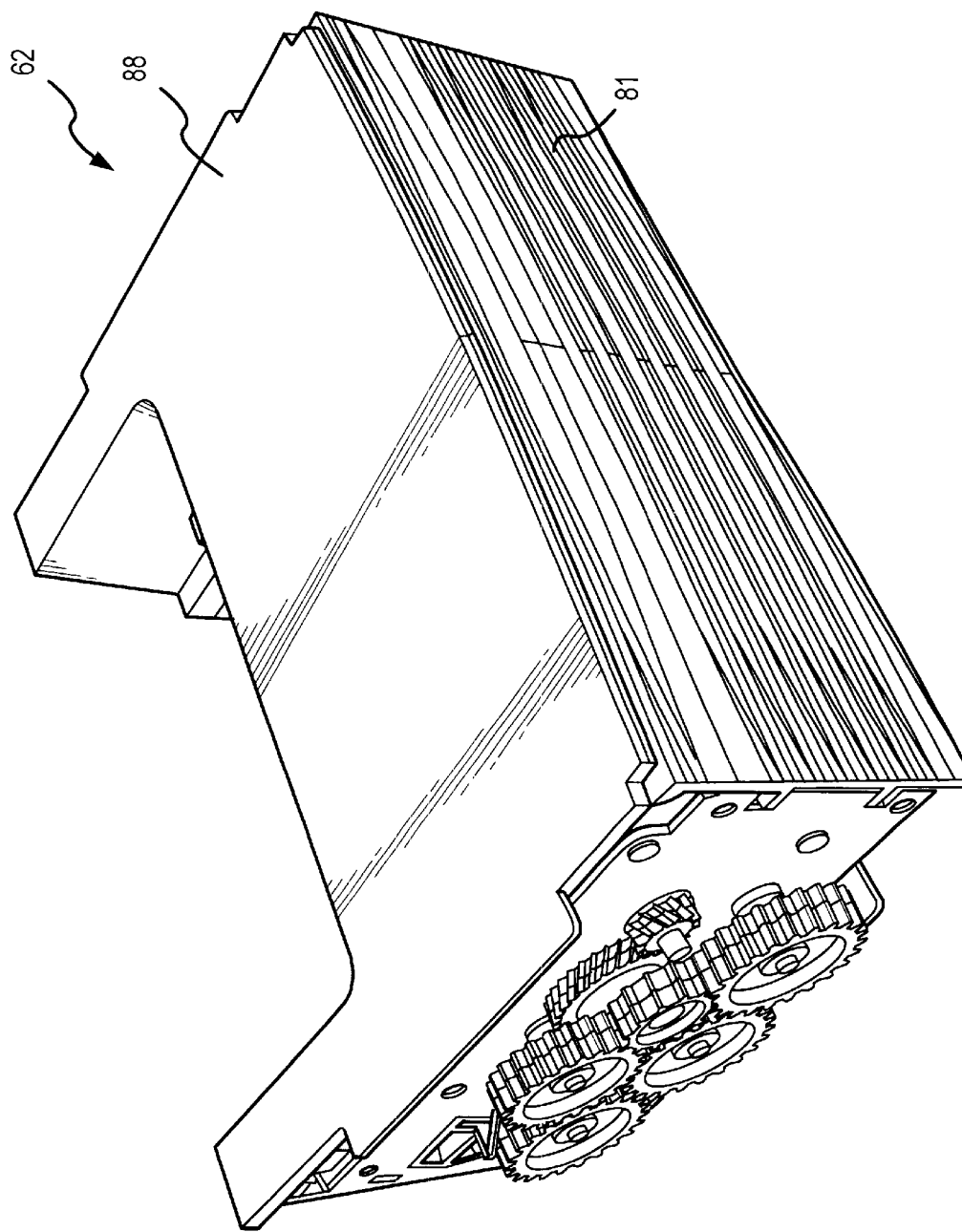
FIG. 4 is a perspective view of the picker assembly.
Figure 5:
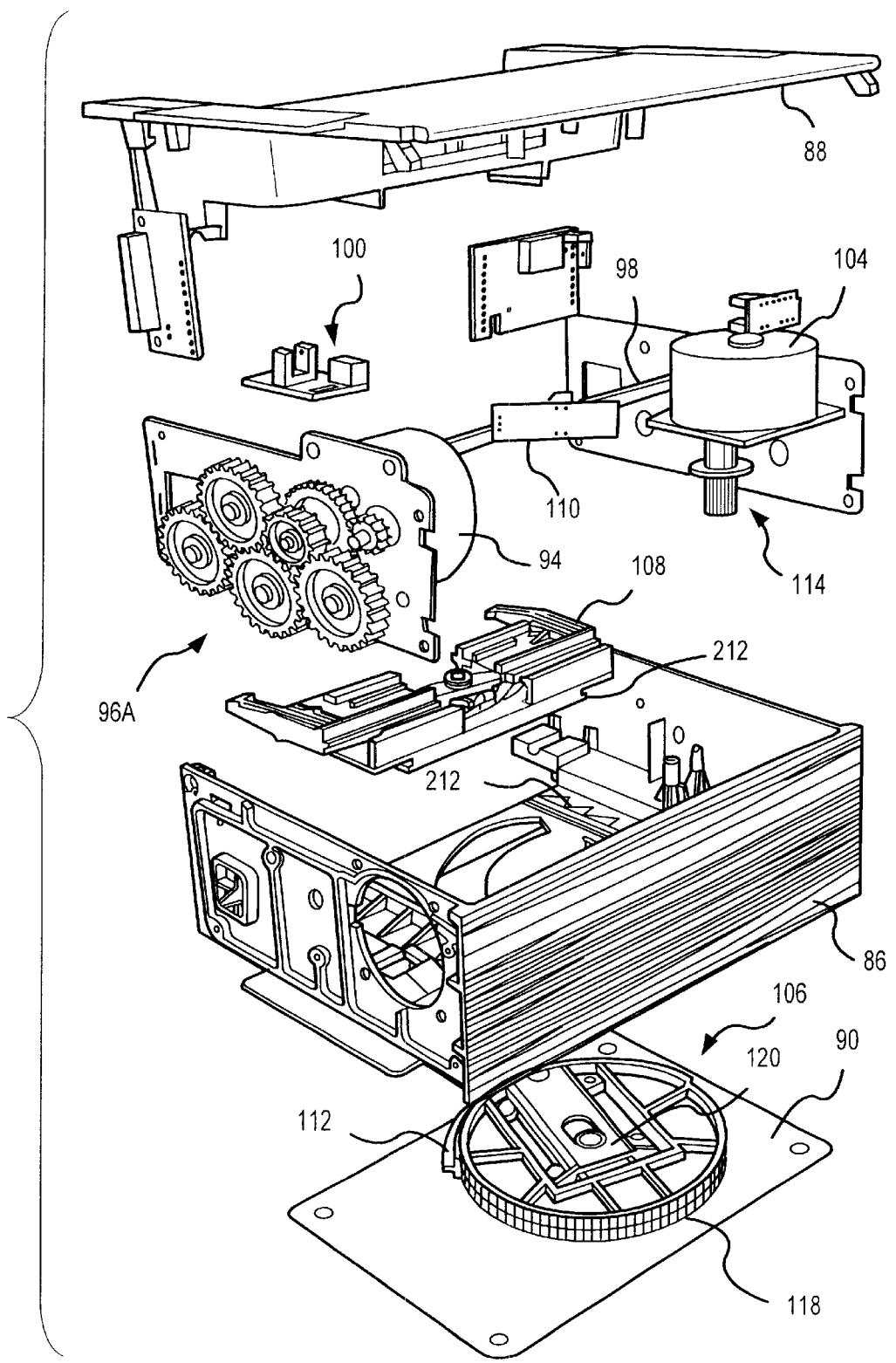
FIG. 5 is an exploded view of the picker assembly shown in FIG. 4.

With reference to FIGS. 4 and 5, the picker assembly 62 generally includes a housing that includes a picker housing base 86, picker top plate 88 and picker bottom plate 90. Within or attached to the picker housing are components that are used to accomplish one of the two following functions: (1) moving the picker assembly up and down along the rack gear pairs 64A, 64B, i.e. components of the elevator assembly 61; and (2) extracting/inserting an tape cartridge from/into the cartridge holder 56 or the tape drive 58, as well as grasping and releasing tape cartridges.

Figure 6:
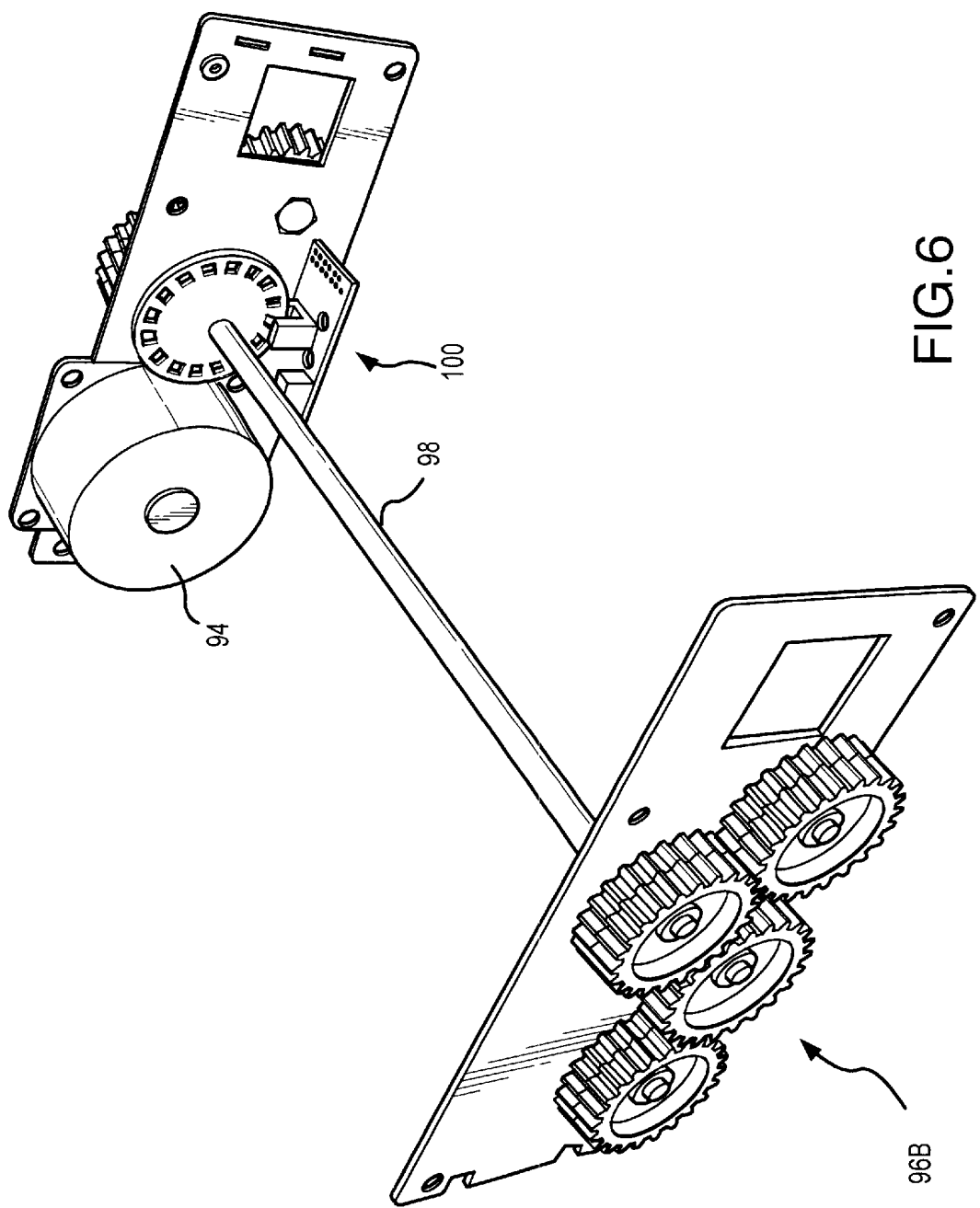
FIG. 6 illustrates the portions of the elevator assembly that are associated with the picker assembly.
Figure 7:
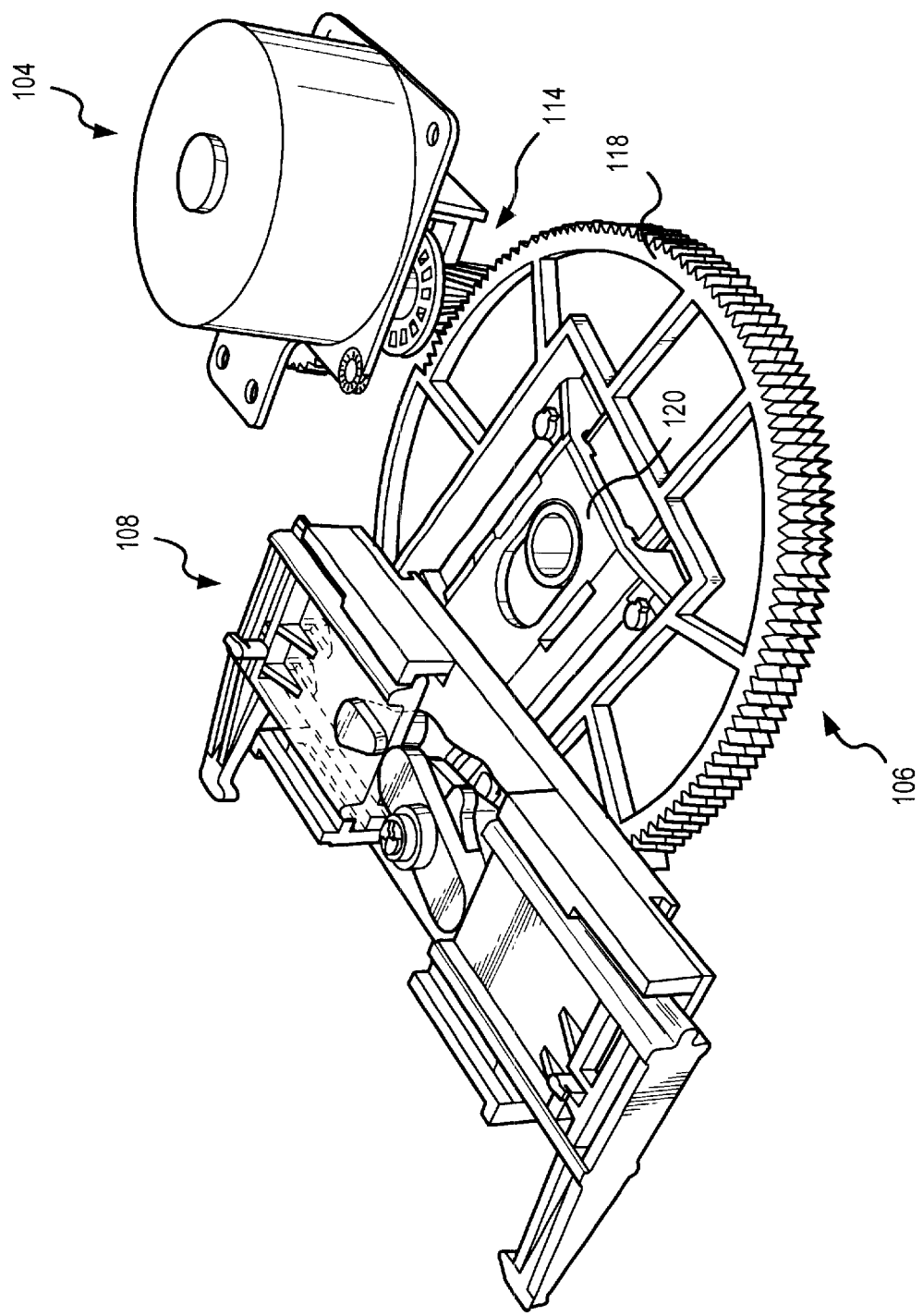
FIG. 7 is a free body diagram of the gripper assembly, gripper stepper motor assembly and gripper crank assembly.
Figure 8:
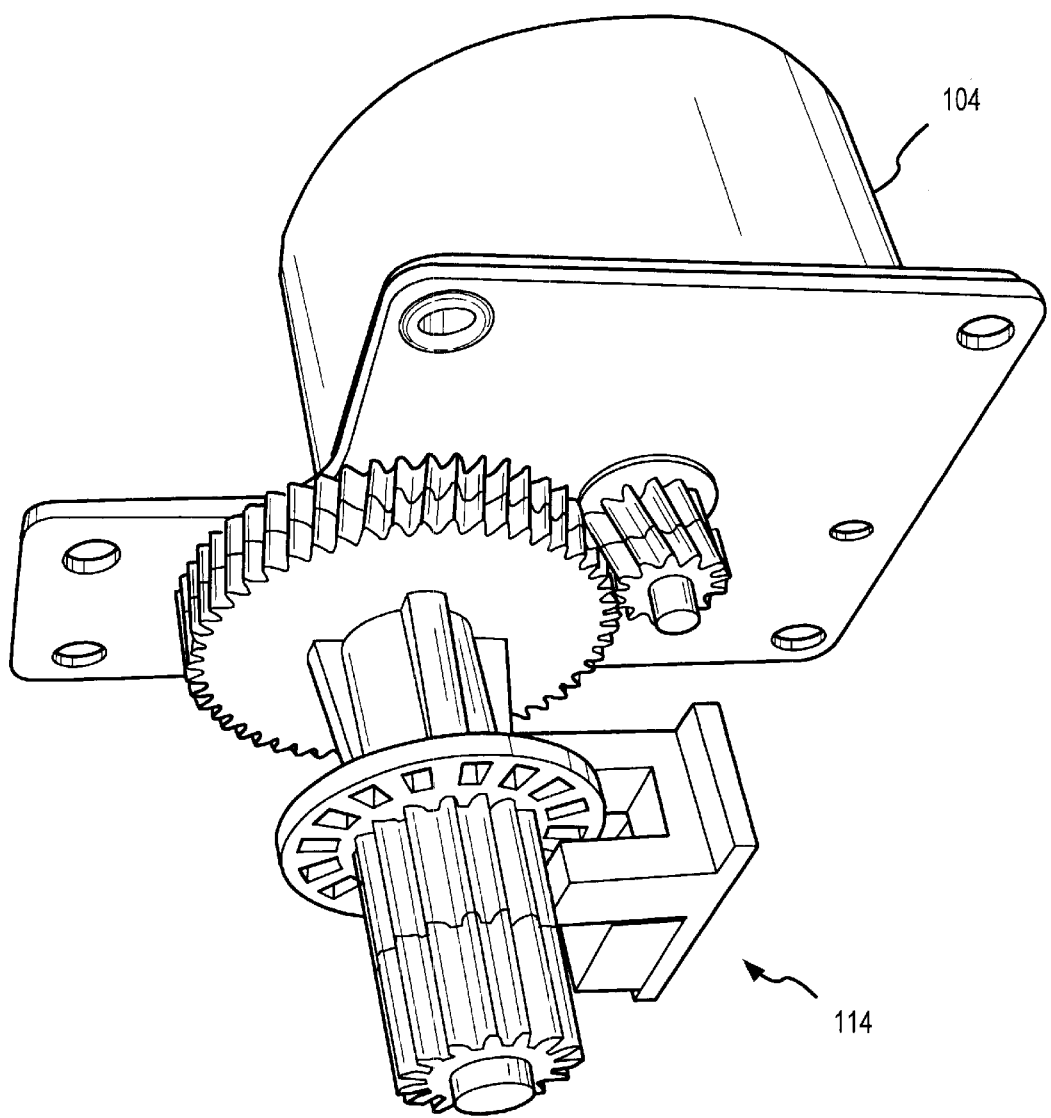
FIG. 8 illustrates the gripper stepper motor assembly.
Figure 9:
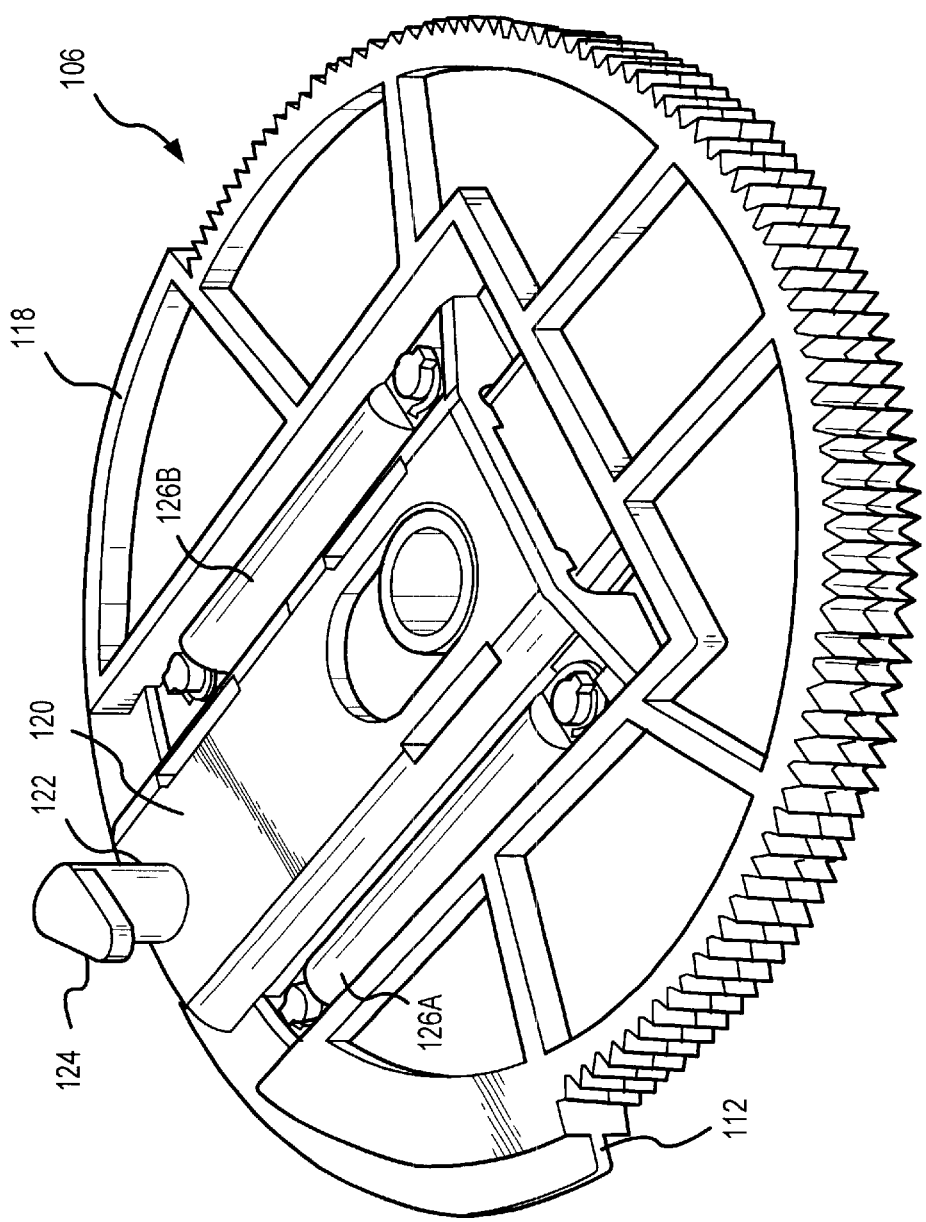
FIG. 9 illustrates the gripper crank assembly.

With reference to FIG. 6 and continuing reference to FIG. 5, the components associated with moving the picker assembly 62 up and down along the rack gear pairs 64A, 64B (which each provide two opposing surfaces) is described. Generally, an elevator stepper motor 94 drives a first elevator gear train 96A and a second elevator gear train 96B that are connected to one another by an elevator cross shaft 98 to move the picker assembly 62 up and down along the rack gear pairs 64A, 64B. The first and second gear trains 96A, 96B respectively interface with the rack gear pairs 64A, 64B such that when the elevator stepper motor is activated the picker assembly 62 moves up or down the racks. The position of the picker assembly 62 is known by counting the "steps" needed by the elevator stepper motor 94 relative to a known reference point to position the picker assembly 62 in front of the slots of the tape cartridge holder 56 and the tape drive 58. An elevator motion detector assembly 100 is used to determine whether or not the elevator stepper motor 94 is moving appropriately in relation to the step count. Failure of the elevator stepper motor 94 to move in response to step commands indicates that the picker assembly 62 has reached an end of its range of motion or has jammed.

With respect to movement of picker assembly, it should be noted that the racks gear pairs 64A, 64B guide the picker assembly 62, as well as contribute to the moving of the picker assembly 62 by interacting with the first and second gear trains 96A, 96B. With respect to the guiding function, the rack portions of the rack gear pairs 64A, 64B cooperate with the first and second gear trains 96A, 96B to constrain the movement in two dimensions. Namely, in the illustrated embodiment, the front-to-back dimension and the up-down dimension. To constrain lateral movement of the picker assembly 62, the rack gear pairs 64A, 64B respectively provide surfaces 230A, 230B that prevent the picker assembly 62 from being laterally displaced to the point where the first and second gear trains 96A, 96B become disengaged from the rack gear pairs 64A, 64B.

With reference to FIGS. 7–10 and continuing reference to FIG. 5, the components associated with extracting/inserting an tape cartridge from/to the cartridge holder 56 or tape drive 58 and gripping/releasing an 8 mm tape cartridge are described. Generally, a gripper stepper motor 104 causes a gripper crank assembly 106 that is journaled to the picker bottom plate 90 to rotate. Rotation of the gripper crank assembly 106 causes, in turn, a gripper assembly 108 to either (1) move towards/away from the cartridge holder 56 or tape drive 58 for extraction/insertion operations; or (2) grasp/release a tape cartridge. The position of the gripper assembly 108 is known by counting the "steps" through which the gripper stepper motor 104 has moved relative to a known reference point. A crank position sensor 110 which detects the presence/absence of a crank position edge 112 within the sensor's field of view is used to determine the state of the gripper during power up. A gripper motion detector 114 indicates whether or not the gripper stepper motor 104 is moving appropriately in relation to the step count. Failure of the gripper stepper motor 104 to move in response to step commands indicates that the gripper crank gear 118 has reached an end of its range of motion or has jammed.

It should be appreciated that all of the sensor devices previously and hereafter mentioned interface to a computer with in the library that is comprised of a processor, an appropriately programmed memory and one or more output ports for controlling the stepper motors and like devices.

The gripper crank assembly 106 is comprised of a gripper crank gear 118 and a slide pin 120 that interfaces with the gripper assembly 108. The slide pin 120 includes a pin 122 that interacts with a surface of the gripper assembly 108 so as to primarily affect the distance of the gripper assembly 108 from the cartridge holder 56 or tape drive 58. Also part of the slide pin is cam hold-open 124 arm that primarily interacts with another portion of the gripper assembly 108 to actuate the portion the gripper assembly 108 that is responsible for grasping tape cartridges. The slide pin 120 is biased in the position illustrated in FIG. 9 by a pair of slide pin springs 126A, 126B. The slide pin springs 126A, 126B do, however, permit the slide pin 120 to move towards the center of the gripper crank gear 118 if a tape cartridge is encountered earlier than expected. This allows the fixed and predetermined path of motion of the gripper assembly 108 to adapt to variations within the library 50 and variations from library to library. The force received by the gripper assembly 108 from the tape cartridge is, in turn, transmitted to the slider pin 120 which accommodates this force by sliding back towards the center of the gripper crank gear 118. Once the force on the gripper assembly 108 is removed, the slide pin springs 126A, 126B operate to return the slide pin 120 to its normal position.

Figure 10:
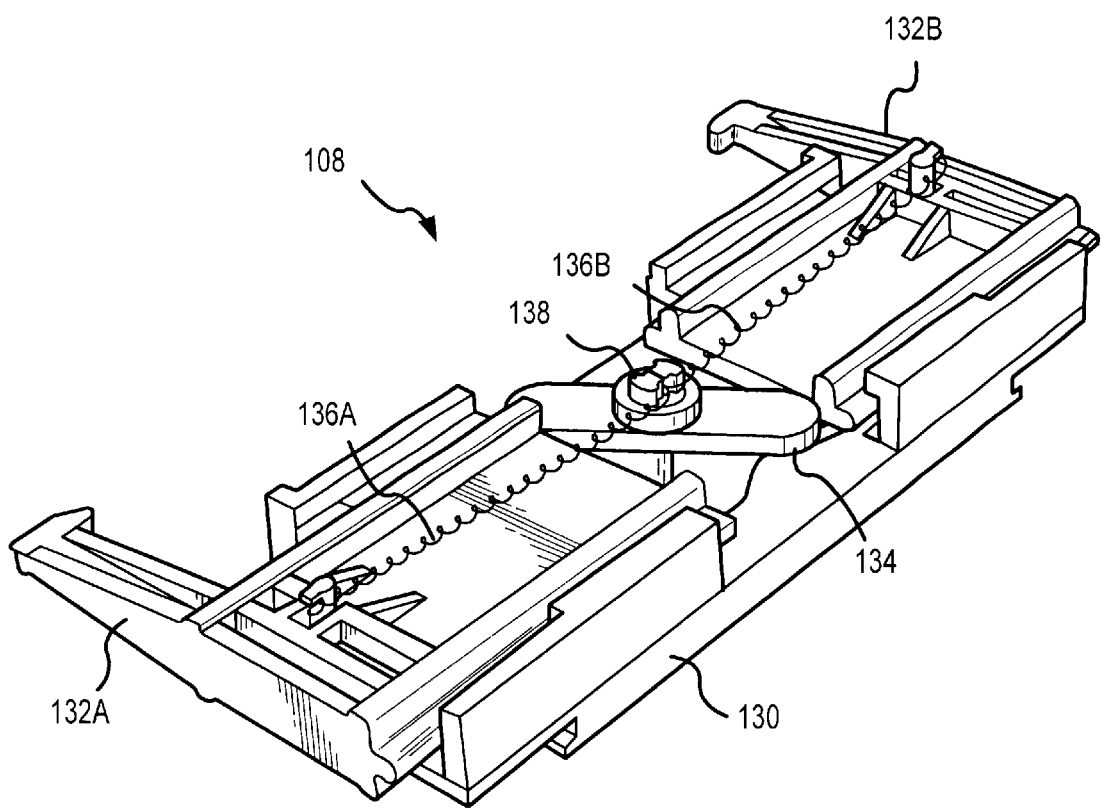
FIG. 10 illustrates the gripper assembly.
Figure 11:
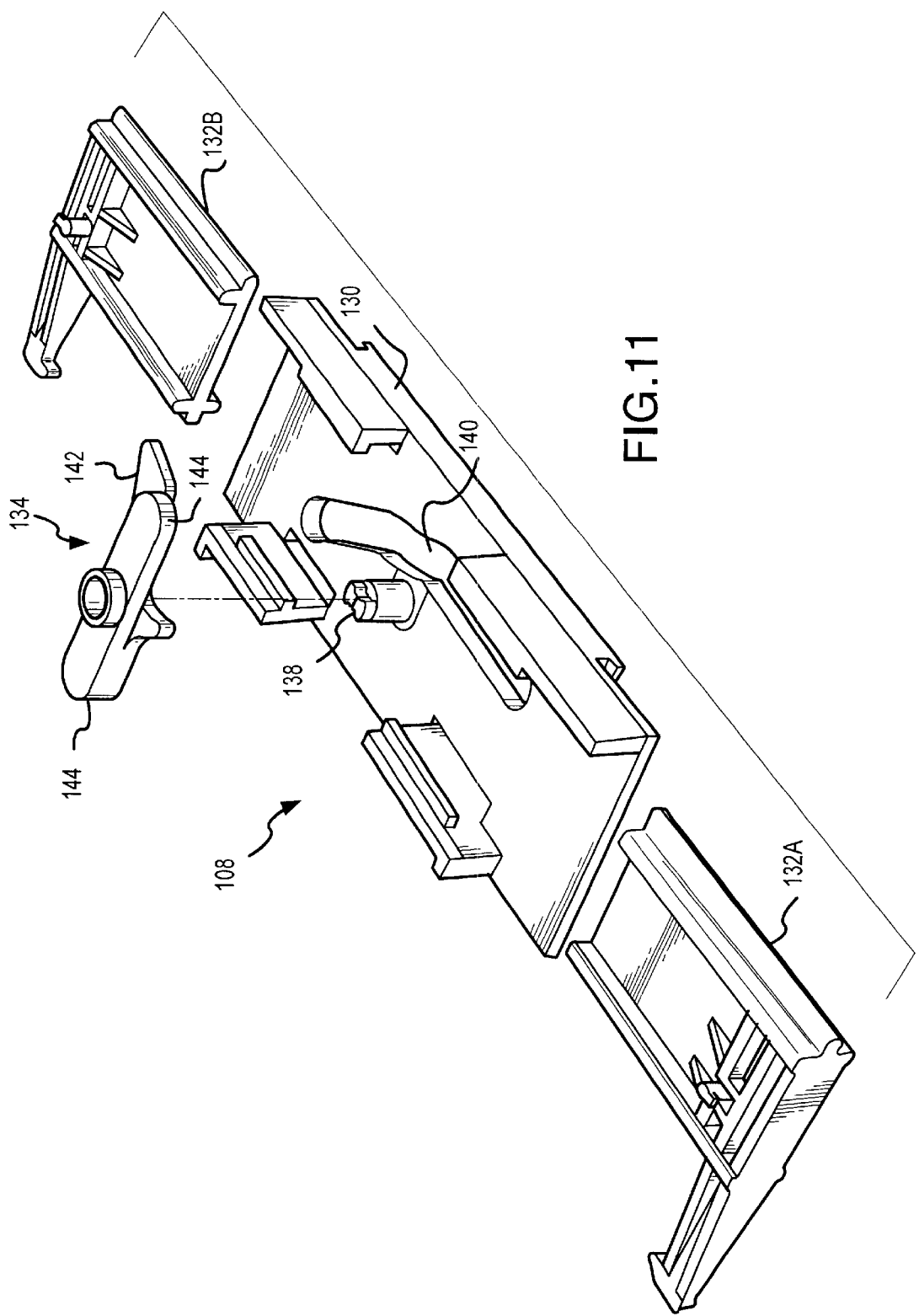
FIG. 11 is an exploded view of the gripper assembly.

With reference to FIGS. 10 and 11, the gripper assembly 108 is comprised of a pusher 130 and first and second gripper jaws 132A, 132B, which are slidably mounted on the pusher 130. The gripper assembly 108 also includes a gripper jaw cam 134 for use in separating first and second jaws 132A, 132B from one another so that a tape cartridge can be grasped. The gripper jaw cam 134 operates to open the first and second gripper jaws 132A, 132B in opposition to first and second gripper jaw springs 136A, 136B. The one end of each of the first and second gripper jaw springs 136A, 136B is connected to a gripper jaw and the other end of each of the springs is connected to a gripper standard 138. The gripper standard 138, which is a portion of the pusher 130, also serves as a mount of the gripper jaw cam 134. Also part of the pusher 130 is a crank pin slot 140 that defines the surface on pusher 130 which engages the pin 122 of the gripper crank assembly 106.

With continuing reference to FIG. 11, the gripper jaw cam 134 includes a hold-open arm 142 that engages the cam hold-open arm 124 of the gripper crank assembly 106. During a particular point in the rotation of the gripper crank gear 118, the cam hold-open arm 124 engages the hold-open arm 142 and upon further rotation causes the hold-open arm 142 to remain rotated and necessarily the rest of the gripper jaw cam 134 to remain rotated.

With continuing reference to FIG. 11, the gripper jaw cam 134 includes an upper cam surface 144 that contacts the ends of the first and second gripper jaws 132A, 132B and upon rotation controls the opening and closing of the first and second gripper jaws 132A, 132B in opposition to the first and second gripper jaw springs 136A, 136B. Consequently, when the cam hold-open arm 124 causes the hold-open arm 142 to rotate, it also causes the upper cam surface 144 to rotate and thereby control the opening and closing of the first and second gripper jaws 132A, 132B.

Figure 12:
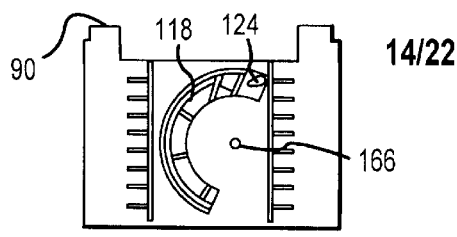
FIG. 12 is a matrix diagram illustrating the relationship of various components in the picker assembly as the gripper crank arm is rotated through its range of motion.
Figure 12:
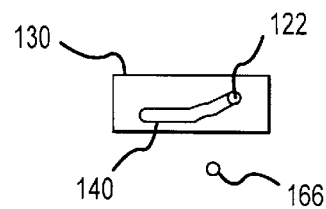
Figure 12:
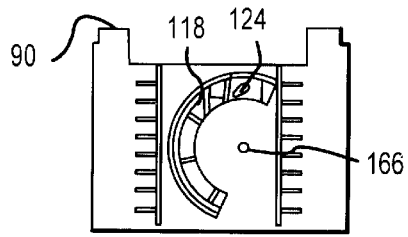
Figure 12:
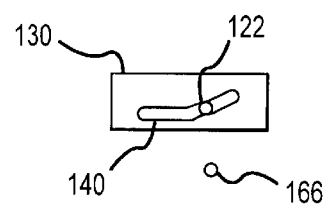
Figure 12:
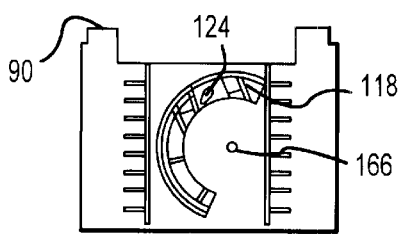
Figure 12:
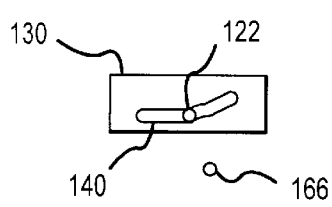
Figure 12:
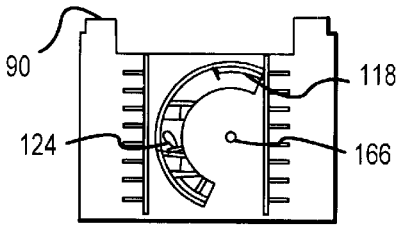
Figure 12:
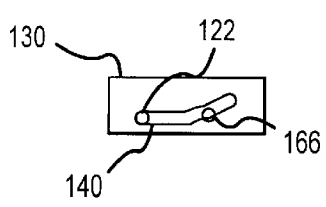
Figure 12:
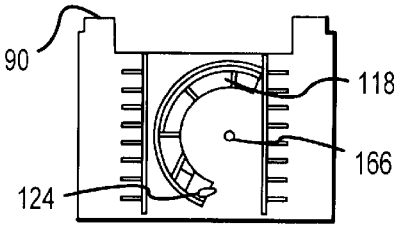
Figure 12:
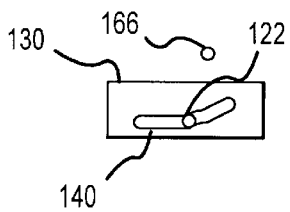
Figure 12:
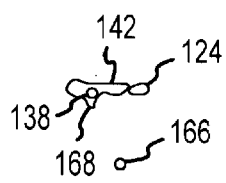
Figure 12:
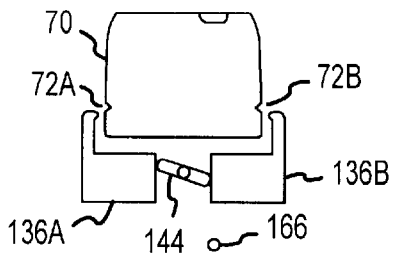
Figure 12:
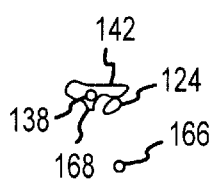
Figure 12:
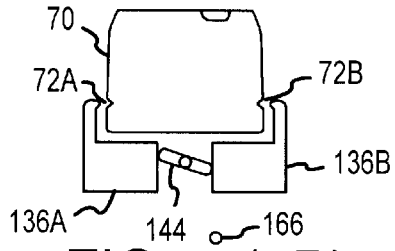
Figure 12:
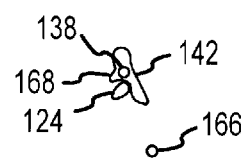
Figure 12:
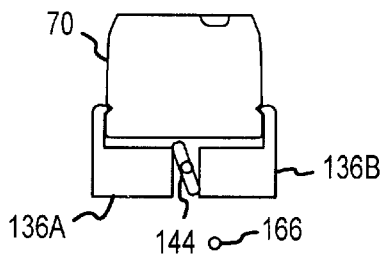
Figure 12:
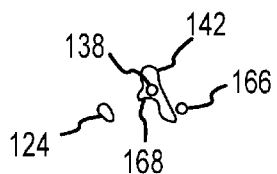
Figure 12:
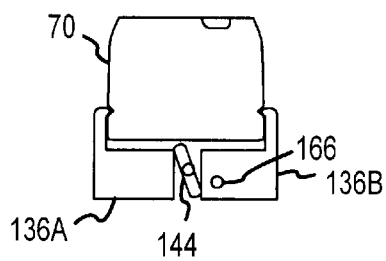
Figure 12:
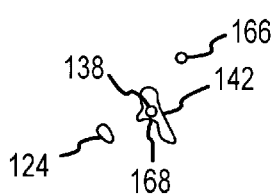
Figure 12:
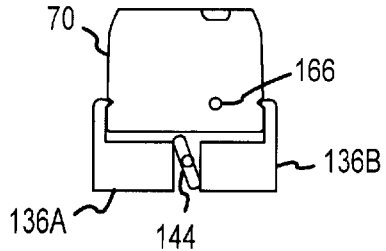

With reference to FIG. 12, the operation of the picker assembly 62 in grasping and extracting/retracting a tape cartridge from either the cartridge holder 56 or the tape drive 58 to a point at which the elevator assembly 61 can move the tape cartridge to another location in the library is described. Initially, the picker assembly 62 must be positioned in front of a cell in the cartridge holder 56 or the tape drive 58. Such positioning is accomplished with the orientation of elements of the picker assembly 62 illustrated in the sub-drawings 1A–4A of FIG. 12. (A point of reference for all of the sub-drawings in FIG. 12 is an axis of rotation 166 for the gripper crank gear 118). Notably, with this orientation of the picker assembly elements, the picker assembly 62 can be positioned by the elevator assembly 61 in front of any cell in the cartridge holder 56 or in front of the tape drive 58 with the first and second gripper jaws 136A, 136B positioned very close to the gripper notches 72A, 72B of the tape cartridge. As a consequence, the picker assembly 62 avoids the wear and tear that is associated with picker mechanisms where a full extension of the picker mechanism is required after the picker mechanism has been appropriately positioned. To elaborate, when the picker assembly 62 is not grasping a data cartridge (for example, after the insertion of a data cartridge into the holder 56 or the drive 58), the picker assembly 62 and particularly the gripper assembly 108 is capable of being positioned close to the holder 56 or the drive 58 rather than being positioned at the filly retracted position. The filly retracted position is the point at which the elevator assembly 61 can move the picker assembly 62 to desired locations within the library 50 when the gripper assembly 108 is holding a data cartridge. By providing the ability to position the gripper assembly 108 close to the holder 56 or drive 58 when the gripper assembly 108 is not holding a tape cartridge, the wear and tear associated with moving the gripper assembly 108 to retract a data cartridge is avoided, thereby reducing wear and tear on the system. Moreover, the speed of operation is improved.

In sub-drawing 1A, the gripper crank gear 118 has been fully rotated in the clockwise direction. With the gripper crank gear 118 in this position, the pin 122 is positioned at the right end of the crank pin slot 140 (2A); the cam hold-open arm 124 is contacting the hold-open arm 142 (3A); and the upper cam surface 144 is bearing against the ends of the first and second gripper jaws 132A, 132B (in opposition to the first and second gripper jaw springs 136A, 136B) such that the jaws are both laterally spaced and somewhat retracted from the gripper notches 72A, 72B of the cartridge (4A). Again, with this orientation of picker assembly components, the picker assembly 62 can be positioned anywhere within the range of motion defined for the elevator components of the library 50.

In sub-drawing 1B, the gripper crank gear 118 has been rotated in a counterclockwise direction so as to position the first and second gripper jaws 132A, 132B for gripping the tape cartridge. With the gripper crank gear 118 in this position, the pin 122 has now moved down and left in the crank pin slot 140 such that it is positioned at the end of a straight portion of the slot and at the beginning of an arcuate portion of the slot (2B). Further, the cam hold-open arm 124 is still in contact with the hold-open arm 142 (3B). As a consequence, the upper cam surface 144 is still contacting the ends of the first and second gripper jaws 132A, 132B such that the jaws are laterally spaced from the gripper notches 72A, 72B of the tape cartridge (4B). However, due to the interaction between the pin 122 with the crank pin slot 140, the first and second gripper jaws 132A, 132B are now positioned for grasping the tape cartridge (4B).

In sub-drawing 1C, the gripper crank gear 118 has been further rotated in the counter-clockwise direction so as to cause the first and second gripper jaws 132A, 132B to grasp the tape cartridge. With the gripper crank gear 118 in this position, it should be appreciated that the pin 122 has now moved over the arcuate section of the crank pin slot 140 (2C). The arcuate section of the crank pin slot 140 has a radius measured from the axis 166 that is substantially equal to the radius from the axis 166 to the pin 122. As a consequence, when the pin 122 is moved along this section of the crank pin slot 140, the position of the pusher 130 is substantially unaffected, thereby maintaining the position of the first and second gripper jaws 132A, 132B so that the tape cartridge can be grasped. During the further counter clockwise rotation of the gripper crank gear 118, the cam hold-open arm 124 has begun to disengage from the hold-open arm 142, thereby permitting the hold-open arm 142 to rotate in a clockwise direction (3C). Due to the rotation of the hold-open arm 142, the upper cam surface 144 has also rotated in a clockwise direction, thereby permitting the first and second gripper jaw springs 136A, 136B to pull the first and second gripper jaws 132A, 132B together and thereby grasp the tape cartridge (4C). It should also be appreciated that the cam hold-open arm 124 contacts a safety arm 168 that forces the hold-open arm 142 to rotate if, for some reason, the first and second gripper jaw springs 136A, 136B are unable to force the required rotation of the hold-open arm 142 (3C).

In sub-drawing 1D, the gripper crank gear 118 has been further rotated in the counter-clockwise direction so as to begin to retract the pusher and the tape cartridge back into the picker housing. During the further rotation of the gripper crank gear 118, the pin 122 has moved from the end of the arcuate section of the crank pin slot 140 to the left end of the crank pin slot 140 (2D); the cam hold-open arm has entirely disengaged from the hold-open arm 142 (3D); and the pusher 130 has begun to retract into the picker housing (4D).

In sub-drawing 1E, the gripper crank gear 118 has been further rotated in the counter-clockwise direction so as to fully retract the pusher and the tape cartridge back into the picker housing. During the further rotation of the gripper crank gear 118, the pin 122 has moved from the left end of the crank pin slot 140 back toward the arcuate section of the slot (2E); and the pusher 130 and tape cartridge have been entirely retracted into the picker housing (4E). At this point, the picker assembly 62 can be moved to a new location (a cell of the cartridge holder 56 or the tape drive 58) and the tape cartridge inserted and released by reversing the noted sequence of operations.

It should also be appreciated at this point that, other than the gripper stepper motor 104, no other electro-mechanical device is utilized in the gripping, retracting, inserting and releasing operations.

It should also be appreciated that the circular movement of the gripper crank gear 118 and the interaction of the pin 122 with the pusher 130, which is constrained to move linearly by a rail structure 212 (FIG. 5), the gripper assembly 108 moves in a sinusoidal manner. More specifically, the velocity of the gripper assembly 108 during insertion and retraction is described by a substantially sinusoidal curve, i.e. a plot of the velocity of the gripper assembly during insertion and retraction substantially follows a sinusoidal curve. Moreover, the relationship of the noted elements has been chosen so that when the gripper assembly 108 is near either the holder 56 or drive 58, the velocity of the gripper assembly 108 is at or near a low velocity point on a sinusoidal velocity curve. Relatedly, when the gripper assembly 108 is further from the holder 56 or drive 58, the velocity of the gripper assembly is at a higher velocity point on the sinusoidal velocity curve. Another aspect of this sinusoidal operation is that the force applied by the gripper assembly 108 to a data cartridge is greater near the holder 56 or drive 58 and lower further from the holder 56 or drive 58. This is particularly important when a drive is used that requires a forced insertion/extraction of a data cartridge. In such cases, the operation of the slide pin 120 as a safety is further appreciated.

With reference to FIGS. 13A–13F, the tape cartridge holder 56 is comprised of an open-sided box-like structure 400 that is capable of holding a plurality of tape cartridges and a dust cover 402 for covering the open side of the holder 56 when the holder has, for example, been removed from the cabinet 52. The cartridge holder 56 includes a coupling structure 404 for attaching the dust cover 402 to the box-like structure 400. The coupling structure 404 operates to attach the dust cover 174 to the box-like structure both when the holder is not in use and when the holder 56 is in use, i.e. mounted within the cabinet 52. The coupling structure 404 includes a pair of arrow-shaped structures 406A, 406B that are attached to the ends of the box-like structure 400 and a pair of slots 408A, 408B that are associated with the dust cover 402. In operation, the pair of arrow-shaped structures 406A, 406B to pass through the pair slots 408A, 408B to attach the dust cover 402 to the box-like structure 400.

Figure 13A:
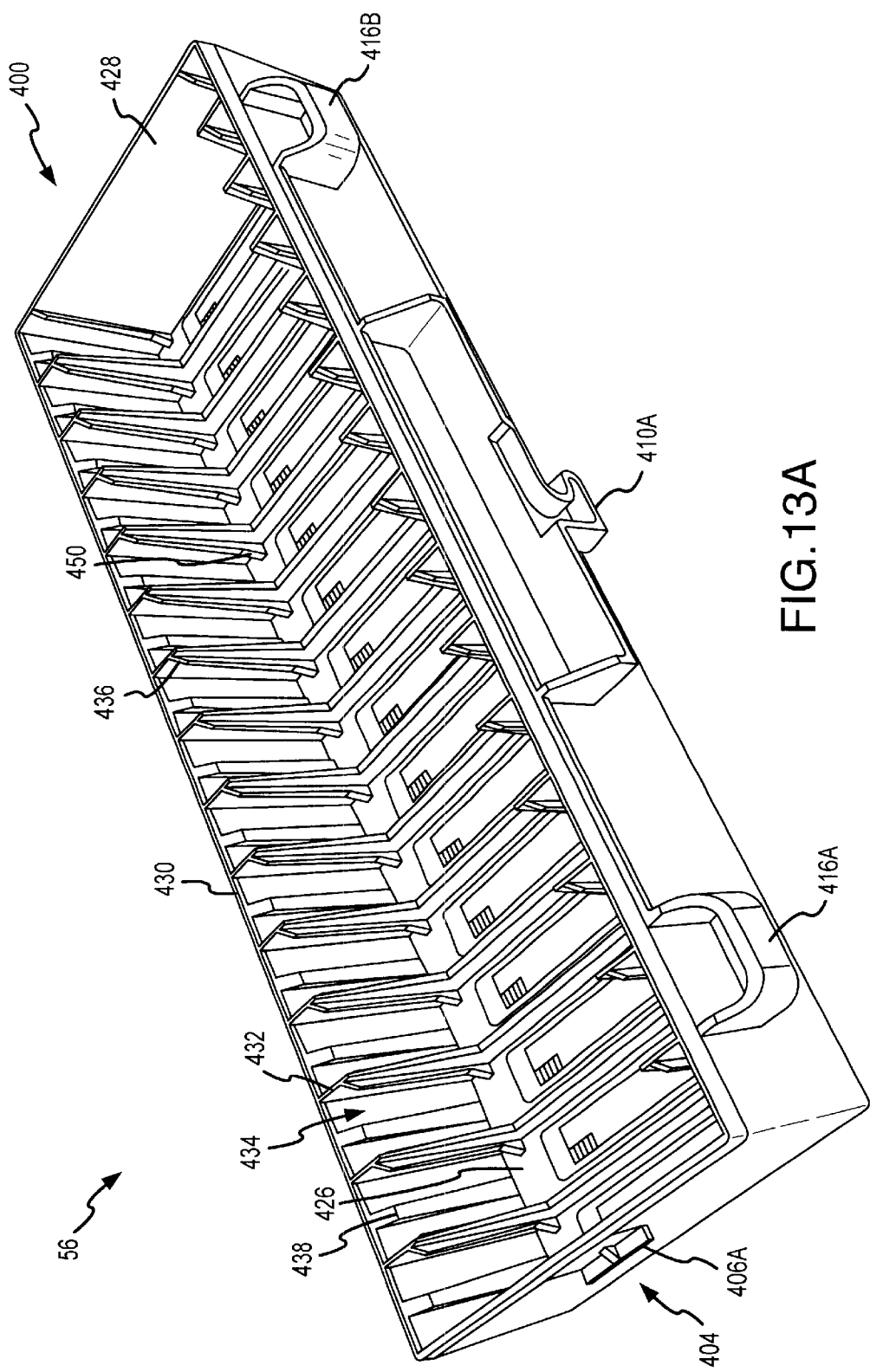
FIGS. 13A–13F illustrate the 8 mm data cartridge holder.
Figure 13B:
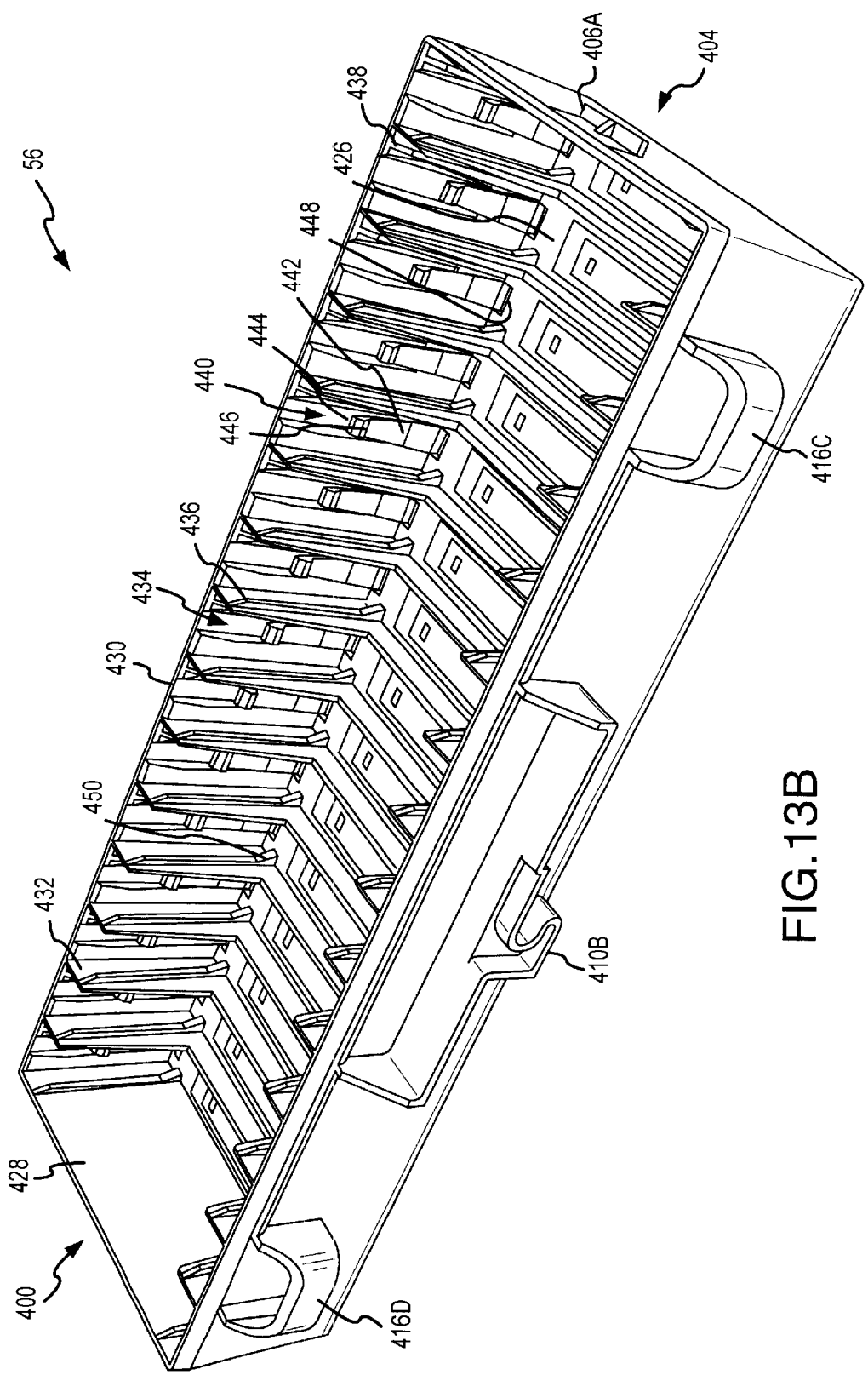
Figure 13C:
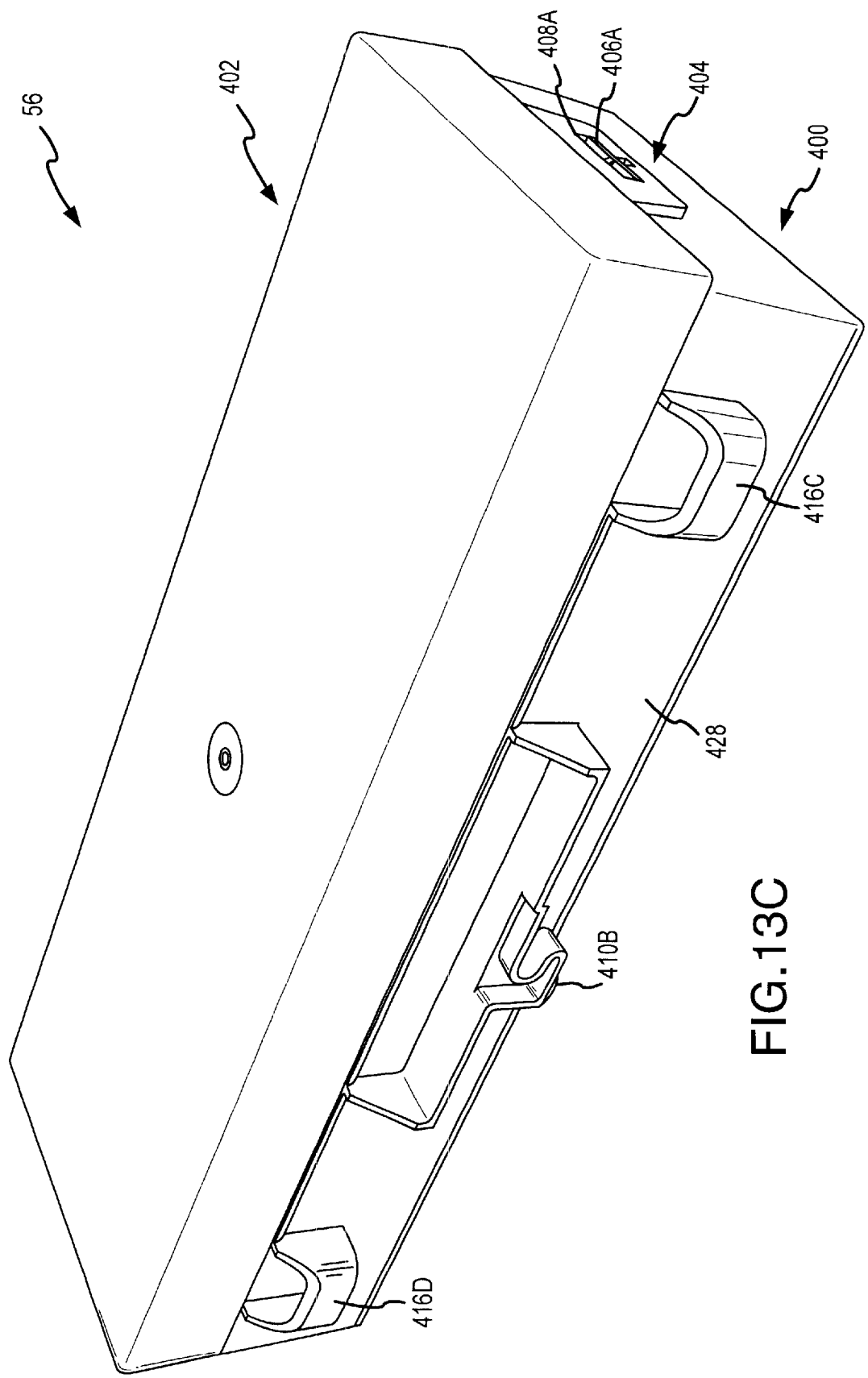
Figure 13D:
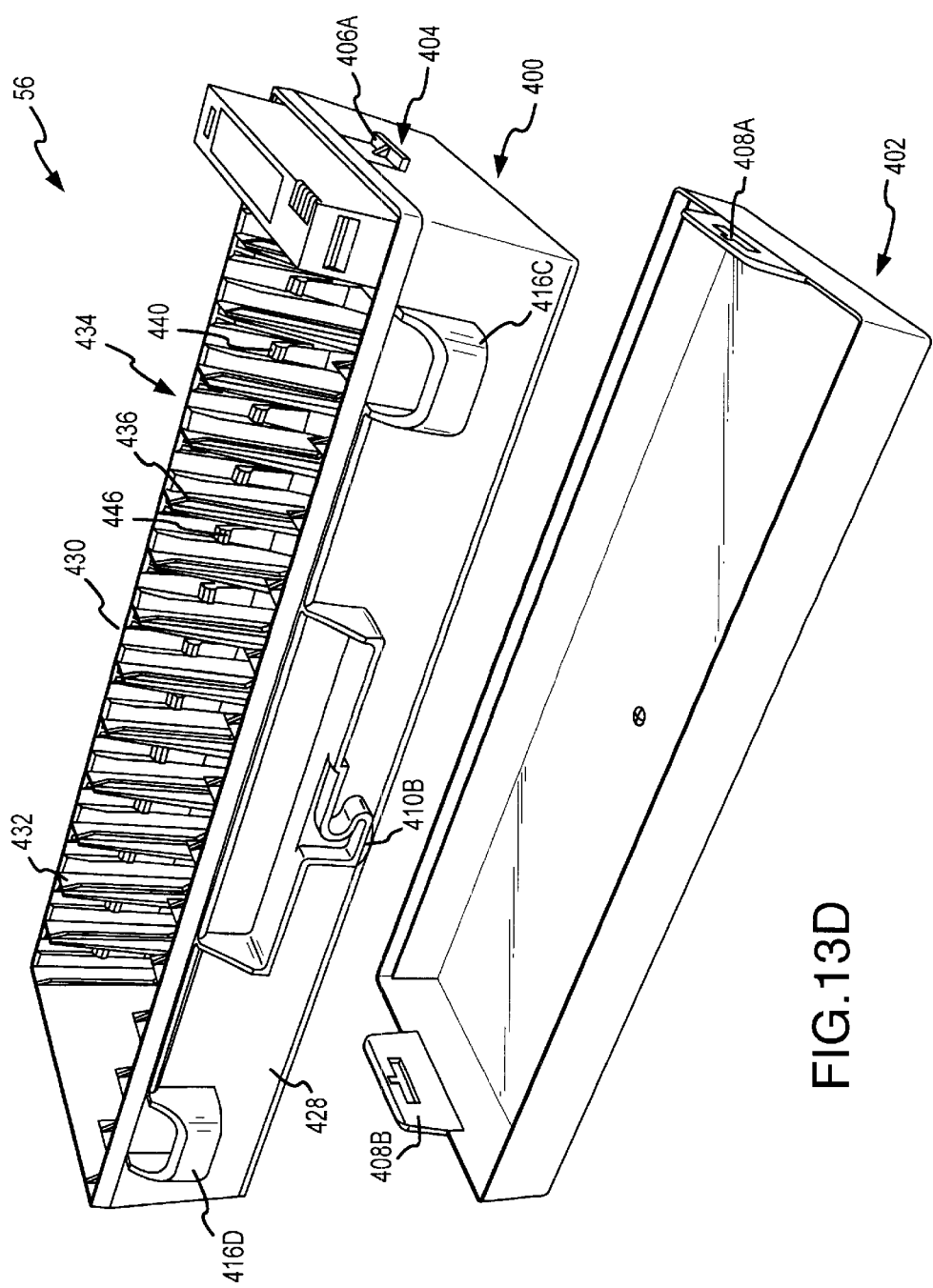
Figure 13E:
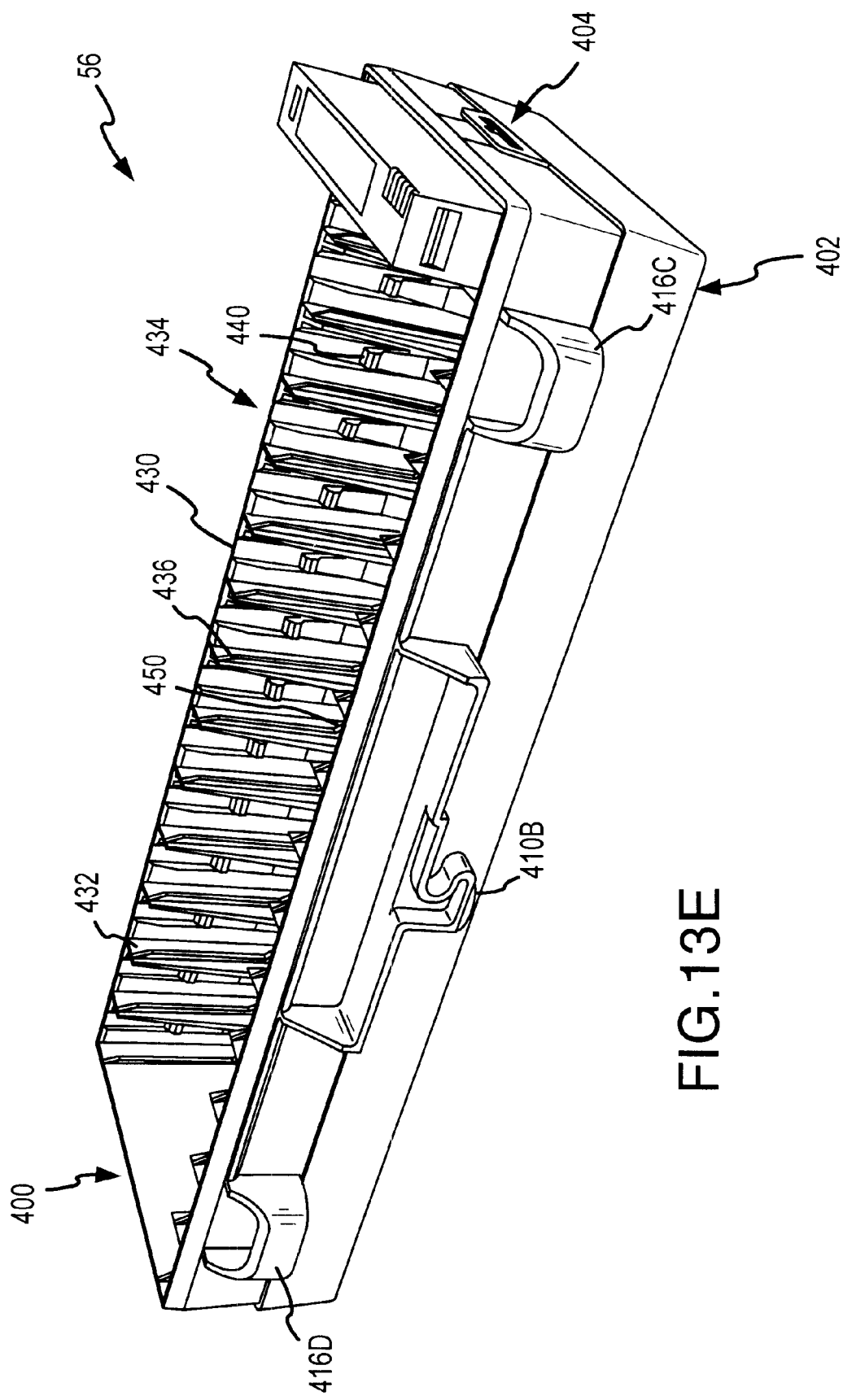
Figure 13F:
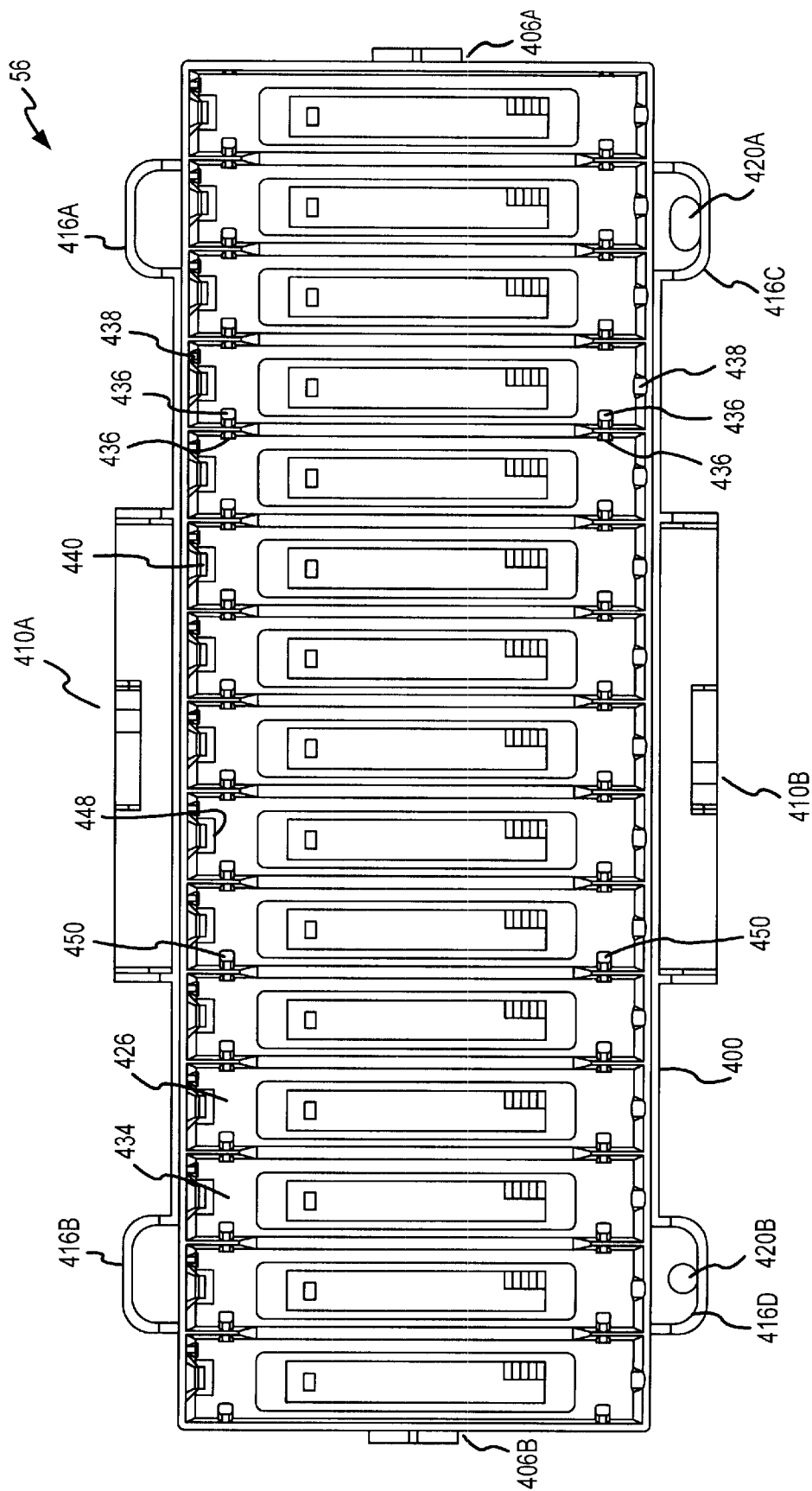

With reference to FIG. 13D, the depth of the box-like structure 400 leaves the gripper notches 324, 326 of the cartridge 300 exposed to facilitate grasping by the picker assembly 62. As a consequence, the dust cover 402 has a U-shaped cross-section. Further, the dust cover 402 is of slightly greater length and width than the box-like structure 400. These greater dimensions permit the dust cover 402 to "nest" the box-like structure 400 (FIG. 13E) when the box-like structure 400 is mounted within the cabinet 52. To facilitate this nesting capability the pair of arrow-shaped structures 406A, 406B are located on the side of the box-like structure at a point that is approximately mid-way between the bottom of the box-like structure 400 and the upper-most surface of a data cartridge that is housed in the holder 56.

With continuing reference to FIGS. 13A–13F, the removable tape cartridge holder 56 also includes a connector structure for facilitating attachment of the holder 56 within the cabinet 52 of the library 50. The connector structure includes a pair of hooks 410A, 410B that cooperate with a pair of latches 412A, 412B (FIG. 2) located adjacent to a mounting hole 414 (FIG. 2) within the cabinet 52 that receives the box-like structure 400 and any attached dust cover 402. The pair of hooks 410A, 410B are attached to the side of the box-like structure 400 but spaced sufficiently away from the side of box-like structure 400 so as not to interfere with the attachment of the dust cover 402 to the box-like structure 400, either when the box-like structure 400 is nested within the dust cover 402 or when the dust cover 402 cover the open side of the box-like structure 400.

The connector structure also provides a reference structure that facilitates proper orientation of the holder when mounted in the cabinet 54. With continuing reference to FIGS. 13A–13F, the flat undersides of mounting bosses 416A–416D define a reference plane that contacts the flat mounting surface 418 (FIG. 2) adjacent to the hole 414 that receives the holder 56 within the cabinet 52 to properly orient the holder in one dimension. Further, bosses 416C, 416D respectively include holes 420A, 420B that receive mounting pins 422A, 422B (FIG. 2) that are associated with the mounting surface 418 to properly orient the holder in the other two dimensions. Because the holder is symmetrical about its longitudinal axis, the mounting pins 422A, 422B and the holes 420A, 420B also insure that the holder 56 is oriented so that cartridges are stored in the holder 56 with an orientation that facilitates the transfer of cartridges between the holder 56 and the drive 58.

With reference to FIGS. 13A–13F, the tape cartridge holder 56 is comprised of a bottom wall 426 and a side wall 428 that extends from the bottom wall 426 to a side wall edge 430, which defines the opening through which the 8 mm tape cartridges are inserted/extracted into/from the holder 56. The holder 56 includes a plurality of partitions 432 that divide the interior space of the holder 56 into a number of cells or slots 434 that are each capable of accommodating an 8 mm tape cartridge. A first tapered rib 436 is located at four points on each of the plurality of partition 432, two on opposite sides of the partition at one end of a slot 434 and two on opposite sides of the partition at the other end of the slot. The first tapered ribs 436 associated with a slot serve both to buttress the partition 432 and to guide an 8 mm data cartridge 58 into the slot. Located at each end of a slot 434 is second tapered rib 438 that also facilitates the guiding of a tape cartridge into a slot 434.

Associated with each cell or slot 434 of the tape cartridge holder 56 are structures for retaining an 8 mm tape cartridge 300 and for inhibiting the complete insertion of the cartridge 300 when the cartridge is incorrectly oriented relative to the picker assembly 62 and the tape drive 58. If the cartridge holder 56 permitted a tape cartridge with the incorrect orientation to be completely inserted, it would be difficult to differentiate between a correctly oriented cartridge and an incorrectly oriented cartridge. Further, subsequent manipulation of an incorrectly oriented cartridge could adversely affect the operation of the picker assembly 62 and tape drive 58.

For retaining an 8 mm tape cartridge 300, associated with each slot 434 is a structure for engaging the discontinuity 340 of the cartridge 300. In the illustrated embodiment, the structure is comprised of a single cantilevered member 440 that engages the portion of the outer edge 342 of the door 316 of the cartridge 300 that forms a portion of the discontinuity 340. The cantilever member 440 has a fixed end 442 that is attached to the interior face of the side wall 428 and a free end 444 that can flex in response to insertion/extraction of an 8 mm tape cartridge. The fixed end 442 of the cantilever member 440 located closer to the bottom wall 426 of the holder 56 than the free end 444. Furthermore, the cantilever member 440 extends substantially perpendicular to the bottom wall 426 of the holder 56. Associated with the free end 444 is a triangularly shaped detent 446 that provides angled surfaces for the facilitating the insertion/extraction of an 8 mm data cartridge. The cantilever member 440 is also made from the same piece of material as the box-like structure 400. In making the cantilever member 440 from the same piece of material, a plurality of holes 448 are established in the bottom wall 426 of the box-like structure 400.

During insertion of an 8 mm tape cartridge 300, the corner between the cross member 322 and the first hinged side 318 of the door 316 engages the upper side of the triangularly shaped detent 446 to cause the free end of the cantilever member 440 to flex towards the side wall 428 of the box-like structure. This flexed condition is maintained by the first hinged side 318 of the door 316 until the portion of the portion of the outer edge 342 of the door 316 that defines the discontinuity 340 is reached. At this point, the cantilever member 440 can move towards an unflexed position and the detent 446 can bear against the outer edge 342 to retain the cartridge 300 in the slot 434. For extraction, the process is reversed. Initially, the outer edge 342 of the door bears against the lower side of the triangularly shaped detent 446 to displace the free end 444 of the cantilever member 440 towards the side wall 428 of the box-like structure. As the extraction progresses, the flexed condition is maintained by the first hinged side 318 of the door 316 until the corner between the cross member 322 and the first hinged side 318 is passed. At this point, the cantilever member 440 can return to the unflexed condition. It should also be noted that the picker assembly 62 is capable of applying enough force to the cartridge 300 to flex the cantilever member 440 for the purposes of inserting/extracting a cartridge 300 into/from the cartridge holder 56.

Figure 14A:
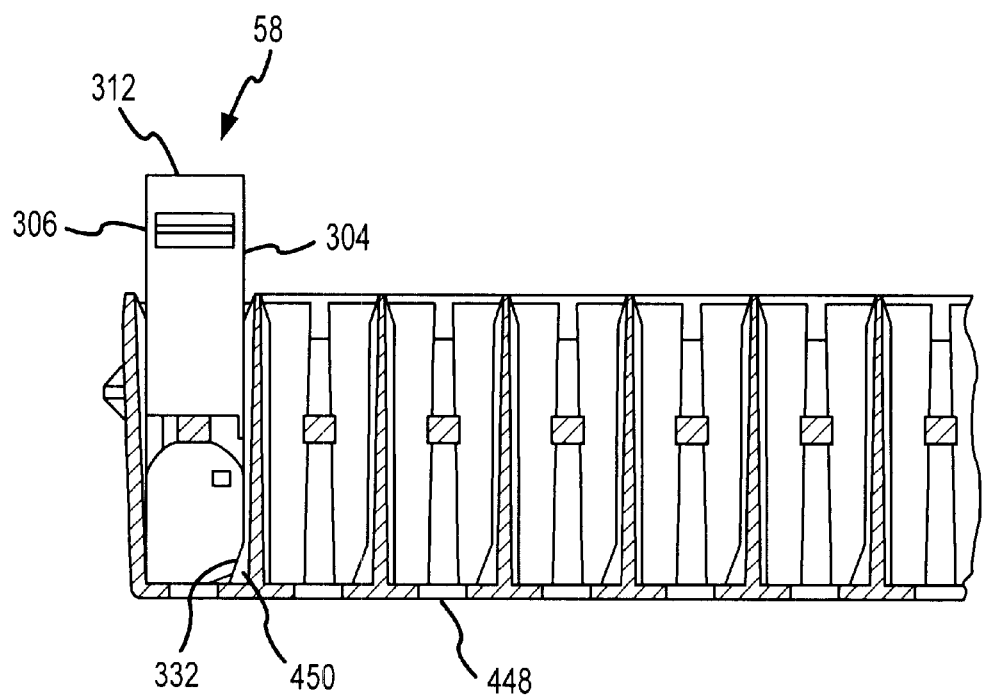
FIGS. 14A–14B are cross-sections of the holder that respectively illustrate the operation of the orientation structure with respect to a data cartridge that is inserted into a slot with the correct orientation and the incorrect orientation.
Figure 14B:
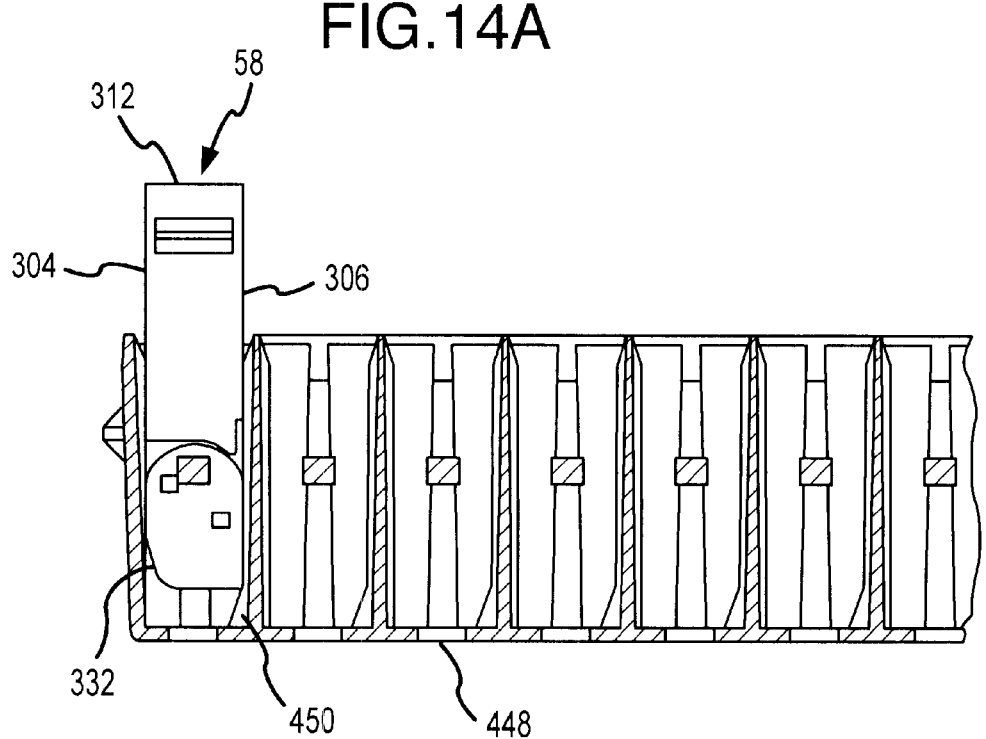

For preventing a tape cartridge from being completely inserted with the incorrect orientation, each cell or slot 434 includes an orientation structure that makes use of the ramp 332 of the cartridge to inhibit incorrectly oriented 8 mm tape cartridges 300 from being completely inserted into the slot 434. In the illustrated embodiment, the orientation structure includes a pair of triangularly shaped elements 450, with one such element associated with each of the first tapered ribs 436 on one side of the slot 434. With reference to FIG. 14A, if an 8 mm tape cartridge is inserted with the correct orientation, the triangularly shaped elements 450 accommodates the ramp 332 of the cartridge 300. An incorrectly oriented cartridge is a cartridge in which either: (1) the corner between the top side 304 and back side 312; (2) the corner between the bottom side 306 and back side 312; or (3) the corner between the bottom side 306 and the front side 314, comes into contact with the triangularly shaped elements 450. In this case, the triangularly shaped elements 450 interfere with the further insertion of the 8 mm tape cartridge. FIG. 14B illustrates how the triangularly shaped elements 450 interfere with the complete insertion of an incorrectly oriented 8 mm data cartridge, i.e, with the corner between the bottom side 306 and the front side 314 engaging the triangularly shaped elements 450.

A number of variations are possible with respect to the structure that makes use of the discontinuity to retain an 8 mm tape cartridge in the holder 56. For instance, a cantilever member with a different orientation of the fixed end relative to the free end is possible. For example, the fixed and free ends of a cantilever member can define a line that extends horizontally or parallel to the bottom wall 426. Alternatively, the fixed end can lie above the free end relative to the bottom wall 426. Alternative resilient structures are also feasible. For instance, a spring loaded ball or button structure can be used. In operation, the spring forces the ball or button into the discontinuity 340 to retain the cartridge. During insertion/extraction operations, the ball or button is displaced away from the cartridge by the side wall of the cartridge, thereby compressing the spring.

The foregoing description of the invention has been presented for the purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extend permitted by the prior art.

What is claimed is:

1. A tape cartridge holder for holding a plurality of 8 mm tape cartridges that each have: (a) a housing for retaining a tape on which data can be recorded and from which data can be retrieved, the housing having a housing top side, housing bottom side that is substantially parallel to the housing top side, a housing first lateral side, a housing second lateral side that is substantially parallel to the housing first lateral side, a housing front side and a housing back side that is substantially parallel to the housing front side, (b) a u-shaped door that is operatively connected to the housing, and when closed, protects the tape, and when open, exposes the tape so that data can be written on or read from the tape, the door having a door first side that forms a portion of said housing first lateral side, a door second side that forms a portion of said housing second lateral side and is substantially parallel to the door first side, a door third side that extends between the door first side and the door second side and forms a substantial portion of said housing front side; (c) the housing first lateral side and the housing second lateral side respectively having a first gripper notch and a second gripper notch that are used by a gripper mechanism to insert/extract an 8 mm tape cartridge into/from the holder; (d) the door first side and the door second side respectively having a first light path window and a second light path window that are used to determine when the door is open and closed; (e) a portion of the housing top side and a portion of the door third side define an asymmetric ramp surface that is disposed at an angle to the remainder of the housing top side so that the housing is asymmetric about a transverse axis of the 8 mm tape cartridge; (f) a switch for use in opening the door that is located adjacent to the door first side; and (g) the housing second lateral side includes a recess that is located between the door second side and the second gripper notch, the tape cartridge holder comprising:

a box structure with an interior space for accommodating a plurality of 8 mm tape cartridges;

wherein said box structure includes a bottom wall with a bottom wall interior surface and a bottom wall exterior surface;

wherein said box structure includes a side wall that is operatively attached to said bottom wall, extends from said bottom wall to a side wall terminal edge, and has a side wall interior surface and a side wall exterior surface;

wherein said bottom interior surface and said side wall interior surface define said interior space;

wherein said side wall terminal edge defines an opening for the insertion/extraction of 8 mm tape cartridges into/from said interior space;

wherein said box structure includes a plurality of partitioning structures for dividing said interior space into a plurality of slots with each of said plurality of slots capable of accommodating a single 8 mm tape cartridge and having a first side that is defined by said side wall and a second side that is defined by said side wall, separated from said first side, and substantially parallel to said first side;

a retaining structure associated with at least one of said plurality of slots and located substantially adjacent to said second side of said at least one of said plurality of slots so as to be able to engage the recess of an 8 mm tape cartridge located between the door second side and the second gripper notch so as to retain the 8 mm tape cartridge in the tape cartridge holder and for not engaging the second light path window, any portion of the housing first lateral side, or any portion of the door first side of the 8 mm tape cartridge; and an orientation structure associated with said at least one of said plurality of slots with which said retaining structure is associated, said orientation structure for inhibiting the insertion of 8 mm tape cartridges that are unproperly oriented such that said retaining structure cannot engage the recess of an 8 mm tape cartridge.

2. A tape cartridge holder, as claimed in claim 1, wherein:
said retaining structure includes a cantilever member with a fixed terminal end and a free terminal end;
wherein said fixed terminal end is operatively attached to said box structure; and
wherein said free terminal end can flex in response to the insertion/retraction of an 8 mm tape cartridge.

3. A tape cartridge holder, as claimed in claim 2, wherein:
said fixed terminal end is located further from said opening of said box structure than said free terminal end.

4. A tape cartridge holder, as claimed in claim 2, wherein:
said fixed terminal end and said free terminal end define-a line that is substantially perpendicular to said bottom wall.

5. A tape cartridge holder, as claimed in claim 2, wherein:
said fixed terminal end and said free terminal end define a line that is substantially perpendicular to said bottom wall; and
said fixed terminal end is located further from said opening of said box structure than said free terminal end.

6. A tape cartridge holder, as claimed in claim 1, wherein:
said orientation structure using the asymmetric ramp surface of the 8 mm tape cartridge as a basis to inhibit insertion of an incorrectly oriented 8 mm tape cartridge.

7. A tape cartridge holder, as claimed in claim 6, wherein:
said orientation structure includes a first orientation structure that is located on said first side of said slot and a second orientation structure that is located on said second side of said slot.

8. A tape cartridge holder, as claimed in claim 1, wherein:
said bottom wall having a plurality of holes with one of said plurality of holes located adjacent to each of said plurality of retaining structures.

9. A tape cartridge holder, as claimed in claim 1, wherein:
said box structure and said plurality of retaining structures are made from the same piece of material.

10. A tape cartridge holder, as claimed in claim 1, further comprising:

a dust cover for placing over said interior space when the holder is not in use;
a coupler for attaching said dust cover to said box structure; and
a connector for attaching/detaching said box structure to/from a tape cartridge library system.

11. A tape cartridge holder for holding a plurality of 8 mm tape cartridges that each have: (a) a housing for retaining a tape on which data can be recorded and from which data can be retrieved, the housing having a housing top side, housing bottom side that is substantially parallel to the housing top side, a housing first lateral side, a housing second lateral side that is substantially parallel to the housing first lateral side, a housing front side and a housing back side that is substantially parallel to the housing front side, (b) a unshaped door that is operatively connected to the housing, and when closed, protects the tape, and when open, exposes the tape so that data can be written on or read from the tape, the door having a door first side that forms a portion of the housing first lateral side, a door second side that forms a portion of the housing second lateral side and is substantially parallel to the door first side, a door third side that extends between the door first side and the door second side and forms a portion of the housing front side; (c) the housing first lateral side and the housing second lateral side respectively having a first gripper notch and a second gripper notch that are used by a gripper mechanism to insert/extract an 8 mm tape cartridge into/from the holder; (d) the door first side and the door second side respectively having a first light path window and a second light path window that are used to determine when the door is open and closed; (e) a portion of the housing top side and a portion of the door third side define an asymmetric ramp surface that is disposed at an angle to the remainder of the housing top side so that the housing is asymmetric about a transverse axis of the 8 mm tape cartridge; (f) a switch for use in opening the door that is located adjacent to said door first side; and (g) a discontinuity that is located adjacent to the door second side, the tape cartridge holder comprising:

a box structure with an interior space for accommodating a plurality of 8 mm tape cartridges;
wherein said box structure includes a bottom wall with a bottom wall interior surface and a bottom wall exterior surface;
wherein said box structure includes a side wall that is operatively attached to said bottom wall, extends from said bottom wall to a side wall terminal edge, and has a side wall interior surface and an side wall exterior surface;
wherein said bottom interior surface and said side wall interior surface define said interior space;
wherein said side wall terminal edge defines an opening for the insertion/extraction of 8 mm tape cartridges into/from said interior space;
said box structure includes a plurality of partitioning structures for dividing said interior space into a plurality of slots with each of said plurality of slots capable of accommodating a single 8 mm tape cartridge;
wherein a first slot of said plurality of slots is defined by a first partitioning structure and a second partitioning structure that is substantially parallel to said first partitioning structure, said first and second partitioning structures both being substantially perpendicular to s aid bottom wall and
an orientation surface associated with said first slot of said plurality of slots for preventing insertion of an 8 mm tape cartridge when an 8 mm tape cartridge such that the asymmetric ramp surface of the 8 mm tape cartridge is not substantially parallel to said orientation surface, wherein said orientation surface defines a plane that traverses parallel planes defined by the said first and second partitioning structures.

12. A tape cartridge holder, as claimed in claim 11, wherein:

said orientation surface includes a first orientation structure that is located on one side of a slot and a second orientation structure that is located on a second side of said slot.

13. A tape cartridge holder, as claimed in claim 11, further comprising:

a plurality of retaining structures with one of said plurality of retaining structures associated with each of said plurality of slots and adapted to engage the discontinuity of an 8 mm tape cartridge located adjacent to the door second side so as to retain the 8 mm tape cartridge in the tape cartridge holder.

14. A tape cartridge holder for holding a plurality of 8 mm tape cartridges that each have: (a) a housing for retaining a tape on which data can be recorded and from which data can be retrieved, the housing having a housing t op si de, housing bottom side that is substantially parallel to the housing top side, a housing first lateral side, a housing second lateral side that is substantially parallel to the housing first lateral side, a housing front side and a housing back side that is substantially parallel to the housing front side, (b) a u-shaped door that is operatively connected to the housing, and when closed, protects the tape, and when open, exposes the tape so that data can be written on or read from the tape, the door having a door first side that forms a portion of the housing first lateral side, a door second side that forms a portion of the housing second lateral side and is substantially parallel to the door first side, a door third side that extends between the door first side and the door second side and forms a portion of the housing front side; (c) the housing first lateral side and the housing second lateral side respectively having a first gripper notch and a second gripper notch that are used by a gripper mechanism to insert/extract an 8 mm tape cartridge into/from the holder; (d) the door first side an d the door second side respectively having a first light path window and a second light path window that are used to determine when the door is open and closed; (e) a portion of the housing top side and a portion of the door third side define an asymmetric ramp surface that is disposed at an angle to the remainder of the housing top side so that the housing is asymmetric about a transverse axis of the 8 mm tape cartridge; (f) a switch for in opening the door that is located adjacent to said door first side; and (g) a discontinuity that is located adjacent to the door second side, the tape cartridge holder comprising:

a box structure with an interior space for accommodating a plurality of 8 mm tape cartridges;

wherein said box structure includes a bottom wall with a bottom wall interior surface and a bottom wall exterior surface;

wherein said box structure includes a side wall that is operatively attached to said bottom wall, extends from said bottom wall to a side wall terminal edge, and has a side wall interior surface and an side wall exterior surface;

wherein said bottom interior surface and said side wall interior surface define said interior space;

wherein said side wall terminal edge defines an opening for the insertion/extraction of 8 mm tape cartridges into/from said interior space;

wherein said box structure includes a plurality of partitioning structures for dividing said interior space into a plurality of slots with each of said plurality of slots capable of accommodating a single 8 mm tape cartridge;

an orientation surface associated with at least one of said plurality of slots for preventing insertion of an 8 mm tape cartridge when engaged by a surface of an 8 mm tape cartridge other than the asymmetric ramp surface of the 8 mm tape cartridge;

a dust cover for placing over said interior space when the removable tape cartridge holder is not in use, wherein said dust cover has a dust cover interior surface, dust cover exterior surface, and a dust cover terminal edge;

a connector for attaching/detaching said box structure to/from a tape cartridge library system, said connector operatively attached to said box structure; and a coupler for attaching said dust cover to said box structure such that said dust cover is not disposed over said opening of said box structure and does not interfere with inserting/extracting tape cartridges into/from said box structure when said box structure is in use.

15. A tape cartridge holder, as claimed in claim 14, wherein:

said dust cover has a dust cover top wall and a dust cover side wall that extends from said dust cover top wall to said dust cover terminal edge;

wherein said dust cover has a generally U-shaped cross section.

16. A tape cartridge holder, as claimed in claim 15, wherein:

said dust cover is dimensioned so that said box structure can fit within said dust cover when said box structure is in use.

17. A tape cartridge holder, as claimed in claim 16, wherein:

at least a portion of said coupler is located on said side wall exterior surface of said box structure at a location that is substantially midway between said bottom wall exterior surface of said box structure and, if a tape cartridge were operatively positioned in said box structure, the housing back side of the tape cartridge.

18. A tape cartridge holder, as claimed in claim 14, wherein:

said connector is operatively attached to and extends outward from said side wall exterior surface of said box structure.

19. A tape cartridge holder, as claimed in claim 18, wherein:

said connector is located so that a portion of said side wall exterior surface of said box structure is located between said side wall terminal edge and said connector.

20. A tape cartridge holder, as claimed in claim 14, wherein:

said connector includes a reference structure for use in properly orienting the tape cartridge holder in a data cartridge library.

21. A tape cartridge holder for holding a plurality of tape cartridges that each have (a) a housing for retaining a tape on which data can be written and from which data can be read, the housing having a housing top side, a housing bottom side that is substantially parallel to the housing top side, a housing first lateral side, a housing second lateral side that is substantially parallel to the housing first lateral side, a housing front side, and a housing back side that is substantially parallel to the housing front side; and (b) a door that is operatively connected to the housing and when closed, protects the tape and when open, exposes the tape, the door having a door outer edge that defines the extent of the door and does not include an edge that defines any hole in the door, the tape cartridge holder comprising:

a box structure with an interior space for accommodating a plurality of tape cartridges;

wherein said box structure includes a bottom wall;

wherein said box structure includes a side wall that is operatively attached to said bottom wall and extends from said bottom wall to a side wall terminal edge;

wherein said side wall terminal edge defines an opening for the insertion/extraction of tape cartridges into/from said interior space;

a plurality of partitioning structures for dividing said interior space into a plurality of slots, each of said plurality of slots capable of accommodating a tape cartridge and having a first side that is defined by said side wall and a second side that is defined by said side wall, separated from said first side, and substantially parallel to said first side;

a plurality of retaining structures with one of said plurality of retaining structures associated with each of said plurality of slots and located substantially adjacent to said second side of said slot so as to be able to engage the outer edge of the door of a tape cartridge to retain the tape cartridge within the tape cartridge holder; and a plurality of orientation structures, with one orientation structure associated with each of said plurality of slots, wherein each orientation structure inhibits the insertion of cartridges that are improperly oriented such that one of said plurality of retaining structures cannot engage the outer edge of the door of a tape cartridge.

22. A tape cartridge holder, as claimed in claim 21, wherein:

each of said plurality of retaining structures is located between said bottom wall and said side wall terminal edge.

23. A tape cartridge holder, as claimed in claim 21, wherein:

each of said plurality of retaining structures includes a cantilever member with a fixed terminal end and a free terminal end;

wherein said fixed terminal end is operatively attached to said box structure; and wherein said free terminal end can flex in response to the insertion/retraction of a tape cartridge.

24. A tape cartridge holder, as claimed in claim 21, further comprising:

a dust cover for placing over said interior space when the holder is not in use;

a coupler for attaching said dust cover to said box structure; and a connector for attaching/detaching said box structure to/from a tape cartridge library system.

25. A tape cartridge holder for holding a plurality of tape cartridges that each have (a) a housing for retaining a tape on which data can be written and from which data can be read, the housing having a housing top side, a housing bottom side that is substantially parallel to the housing top side, a housing first lateral side, a housing second lateral side that is substantially parallel to the housing first lateral side, a housing front side, and a housing back side that is substantially parallel to the housing front side; (b) a door that is operatively connected to the housing and when the door is in a closed position, protects the tape and when the door is in an open position, exposes the tape, the door having a door outer edge that defines the extent of the door and does not include an edge that is surrounded by the door; (c) a recess in the housing that is defined at least in part by the door outer edge, the recess changing shape when the door moves between the closed position and the open position, the tape cartridge holder comprising:

a box structure with an interior space for accommodating a plurality of tape cartridges;

wherein said box structure includes a bottom wall;

wherein said box structure includes a side wall that is operatively attached to said bottom wall and extends from said bottom wall to a side wall terminal edge;

wherein said side wall terminal edge defines an opening for the insertion/extraction of tape cartridges into/from said interior space;

a plurality of partitioning structures for dividing said interior space into a plurality of slots, each of said plurality of slots capable of accommodating a tape cartridge and having a first side that is defined by said side wall and a second side that is defined by said side wall, separated from said first side, and substantially parallel to said first side;

a plurality of retaining structures with one of said plurality of retaining structures associated with each of said plurality of slots and located substantially adjacent to said second side of said slot so as to be able to engage the recess in the housing of the tape cartridge to retain the tape cartridge within the tape cartridge holder; and a plurality of orientation structures, with one orientation structure associated with each of said plurality of slots, wherein each orientation structure inhibits the insertion of cartridges that are improperly oriented such that one of said plurality of retaining structures cannot engage the recess in the housing of a tape cartridge.

26. A tape cartridge holder, as claimed in claim 25, wherein:

each of said plurality of retaining structures is located between said bottom wall and said side wall terminal edge.

27. A tape cartridge holder, as claimed in claim 25, wherein:

each of said plurality of retaining structures includes a cantilever member with a fixed terminal end and a free terminal end;

wherein said fixed terminal end is operatively attached to said box structure; and wherein said free terminal end can flex in response to the insertion/retraction of a tape cartridge.

28. A tape cartridge holder, as claimed in claim 25, further comprising:

a dust cover for placing over said interior space when the holder is not in use;

a coupler for attaching said dust cover to said box structure; and a connector for attaching/detaching said box structure to/from a tape cartridge library system.

* * * * *

UNITED STATES PATENT AND TRADEMARK OFFICE
CERTIFICATE OF CORRECTION

PATENT NO. : 6,433,954 B1
DATED : August 13, 2002
INVENTOR(S) : Eric A. Rinard and Clark D. Brace It is certified that error appears in the above-identified patent and that said Letters Patent is hereby corrected as shown below:

Column 2,
Lines 54, 55, 66 and 67, delete "comers", and insert -- corners --;

Column 5,
Line 1, delete "position permits" and insert -- position, permits --;
Line 4, delete "338 when" and insert -- 338, when --;
Line 15, delete "from", and insert -- form --;

Column 10,
Line 64, delete "440 located", and insert -- 440 is located --;

Column 11,
Lines 8, 25, 46, 48 and 54, delete "comer", and insert -- corner --;

Column 13,
Line 23, delete "unproperly", and insert -- improperly --;
Line 37, delete "define-a", and insert -- define a --;

Column 14,
Line 15, delete "unshaped", and insert -- u-shaped --;
Line 55, delete "said box", and insert -- wherein said box --;
Lines 63-64, delete "s aid", and insert -- said --;

Column 15,
Line 24, delete "t op si de," and insert -- top said, --;
Line 42, delete "a nd the" and insert -- and the --; and

UNITED STATES PATENT AND TRADEMARK OFFICE
CERTIFICATE OF CORRECTION

PATENT NO. : 6,433,954 B1
DATED : August 13, 2002
INVENTOR(S) : Eric A. Rinard and Clark D. Brace It is certified that error appears in the above-identified patent and that said Letters Patent is hereby corrected as shown below:

Column 15,
Line 50, delete "for in" and insert -- for use in --.

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,433,954 B1
DATED : August 13, 2002
INVENTOR(S) : Eric A. Rinard and Clark D. Brace It is certified that error appears in the above-identified patent and that said Letters Patent is hereby corrected as shown below:

Column 2,
Lines 54, 55, 66 and 67, delete "comers", and insert -- corners --;

Column 5,
Line 1, delete "position permits" and insert -- position, permits --;
Line 4, delete "338 when" and insert -- 338, when --;
Line 15, delete "from", and insert -- form --;

Column 10,
Line 64, delete "440 located", and insert -- 440 is located --;

Column 11,
Lines 8, 25, 46, 48 and 54, delete "comer", and insert -- corner --;

Column 13,
Line 23, delete "unproperly", and insert -- improperly --;
Line 37, delete "define-a", and insert -- define a --;

Column 14,
Line 15, delete "unshaped", and insert -- u-shaped --;
Line 55, delete "said box", and insert -- wherein said box --;
Lines 63-64, delete "s aid", and insert -- said --;

Column 15,
Line 24, delete "t op si de," and insert -- top side, --;
Line 42, delete "a nd the" and insert -- and the --; and

UNITED STATES PATENT AND TRADEMARK OFFICE
CERTIFICATE OF CORRECTION

PATENT NO. : 6,433,954 B1
DATED : August 13, 2002
INVENTOR(S) : Eric A. Rinard and Clark D. Brace It is certified that error appears in the above-identified patent and that said Letters Patent is hereby corrected as shown below:

<u>Column 15,</u>
Line 50, delete "for in" and insert -- for use in --.

This certificate supersedes Certificate of Correction issued June 10, 2003.

Signed and Sealed this

Thirteenth Day of January, 2004

JON W. DUDAS
*Acting Director of the United States Patent and Trademark Office*